US012693570B2

(12) United States Patent
Bakopoulos et al.

(10) Patent No.: US 12,693,570 B2
(45) Date of Patent: Jul. 28, 2026

(54) DUAL-FACET DISTRIBUTED FEEDBACK LASER IN MACH-ZEHNDER MODULATOR STRUCTURE

(71) Applicant: Mellanox Technologies, Ltd., Yokneam (IL)

(72) Inventors: Paraskevas Bakopoulos, Ilion (GR); Dimitrios Kalavrouziotis, Papagou (GR); Moshe Oron, Rehovot (IL); Nikolaos Argyris, Zografou (GR); Elad Mentovich, Tel Aviv (IL)

(73) Assignee: Mellanox Technologies, Ltd., Yokneam (IL)

( * ) Notice: Subject to any disclaimer, the term of this patent is extended or adjusted under 35 U.S.C. 154(b) by 496 days.

(21) Appl. No.: 17/870,220

(22) Filed: Jul. 21, 2022

(65) Prior Publication Data

US 2023/0375894 A1 Nov. 23, 2023

(30) Foreign Application Priority Data

May 17, 2022 (GR) .............................. 20220100403

(51) Int. Cl.
G02F 1/225 (2006.01)
G02F 1/21 (2006.01)

(52) U.S. Cl.
CPC .............. G02F 1/212 (2021.01); G02F 1/225 (2013.01)

(58) Field of Classification Search
CPC ........ G02F 1/212; G02F 1/225; H01S 3/0632; H01S 3/0085; H01S 3/10023;
(Continued)

(56) References Cited

U.S. PATENT DOCUMENTS 7,054,511 B2 * 5/2006 Melikechi .............. G02B 6/125
372/29.016
7,999,988 B2 * 8/2011 Koch ...................... H01S 5/026
359/279
(Continued)

OTHER PUBLICATIONS

Fang, Alexander W. et al., "A distributed feedback silicon evanescent laser," Opt. Express 16, 4413-4419 (2008).
(Continued)

*Primary Examiner* — Robert Tavlykaev
(74) *Attorney, Agent, or Firm* — Alston & Bird LLP

(57) ABSTRACT

Embodiments are disclosed for providing a dual-facet distributed feedback (DFB) laser in a Mach-Zehnder modulator (MZM) structure. An example system includes an MZM structure that includes a DFB laser, a first waveguide interferometer arm structure, and a second waveguide interferometer arm structure. The DFB laser is configured to generate an optical input signal where the DFB laser includes a first output facet and a second output facet. The first waveguide interferometer arm structure is coupled to the first output facet of the DFB laser, and the first output facet of the DFB laser emits the optical input signal to the first waveguide interferometer arm structure. The second waveguide interferometer arm structure is coupled to the second output facet of the DFB laser, and the second output facet of the DFB laser emits the optical input signal to the second waveguide interferometer arm structure.

21 Claims, 8 Drawing Sheets

(58) Field of Classification Search
    CPC ............. H01S 3/10038; H01S 3/10053; H01S
                    5/0265; H01S 5/06226; H01S 5/0085;
                    H01S 5/1243; H01S 5/4068
    USPC ........................................................ 385/1–3
    See application file for complete search history.

(56)                   References Cited

U.S. PATENT DOCUMENTS

|  |  |  |  |
| --- | --- | --- | --- |
| 9,270,078 B2 * | 2/2016 | Rickman ............. | H01S 3/10053 |
| 2002/0159684 A1 * | 10/2002 | Sun ......................... | G02F 1/225 |
|  |  |  | 385/20 |
| 2018/0366915 A1 * | 12/2018 | Zilkie ................ | G02B 6/29395 |
| 2023/0361532 A1 * | 11/2023 | Shi ............................ | H01S 5/12 |

OTHER PUBLICATIONS

Fathololoumi, Saeed et al., "1.6 Tbps Silicon Photonics Integrated Circuit and 800 Gbps Photonic Engine for Switch Co-Packaging Demonstration," J. Lightwave Technol. 39, 1155-1161 (2021).

Fernandes, Carlos Ferreira, "Asymmetric QWS DFB Laser Diodes," 2004 IEEE Africon. 7th Africon Conference in Africa, Sep. 15-17, 2004.

Huang, Beiju et al., "100 GB/s Silicon Photonic WDM Transmitter with Misalignment-Tolerant Surface-Normal Optical Interfaces," Micromachines (Basel), May 22, 2019;10(5):336, doi: 10.3390/mi10050336.

Lange, Sophie et al., "Low Switching Voltage Mach-Zehnder Modulator Monolithically Integrated With DFB Laser for Data Transmission up to 107.4 GB/s," J. Lightwave Technol. 34, 401-406 (2016).

Theurer, Michael et al., "2 × 56 GB/s From a Double Side Electroabsorption Modulated DFB Laser and Application in Novel Optical PAM4 Generation," J. Lightwave Technol. 35, 706-710 (2017).

Van Der Tol, Jos J. G. M. et al., "InP Membrane on Silicon (IMOS) Photonics," IEEE Journal of Quantum Electronics, vol. 56, No. 1, Feb. 2020.

Verbist, Jochem et al., "Real-Time and DSP-Free 128 GB/s PAM-4 Link Using a Binary Driven Silicon Photonic Transmitter," J. Lightwave Technol. 37, 274-280 (2019).

* cited by examiner

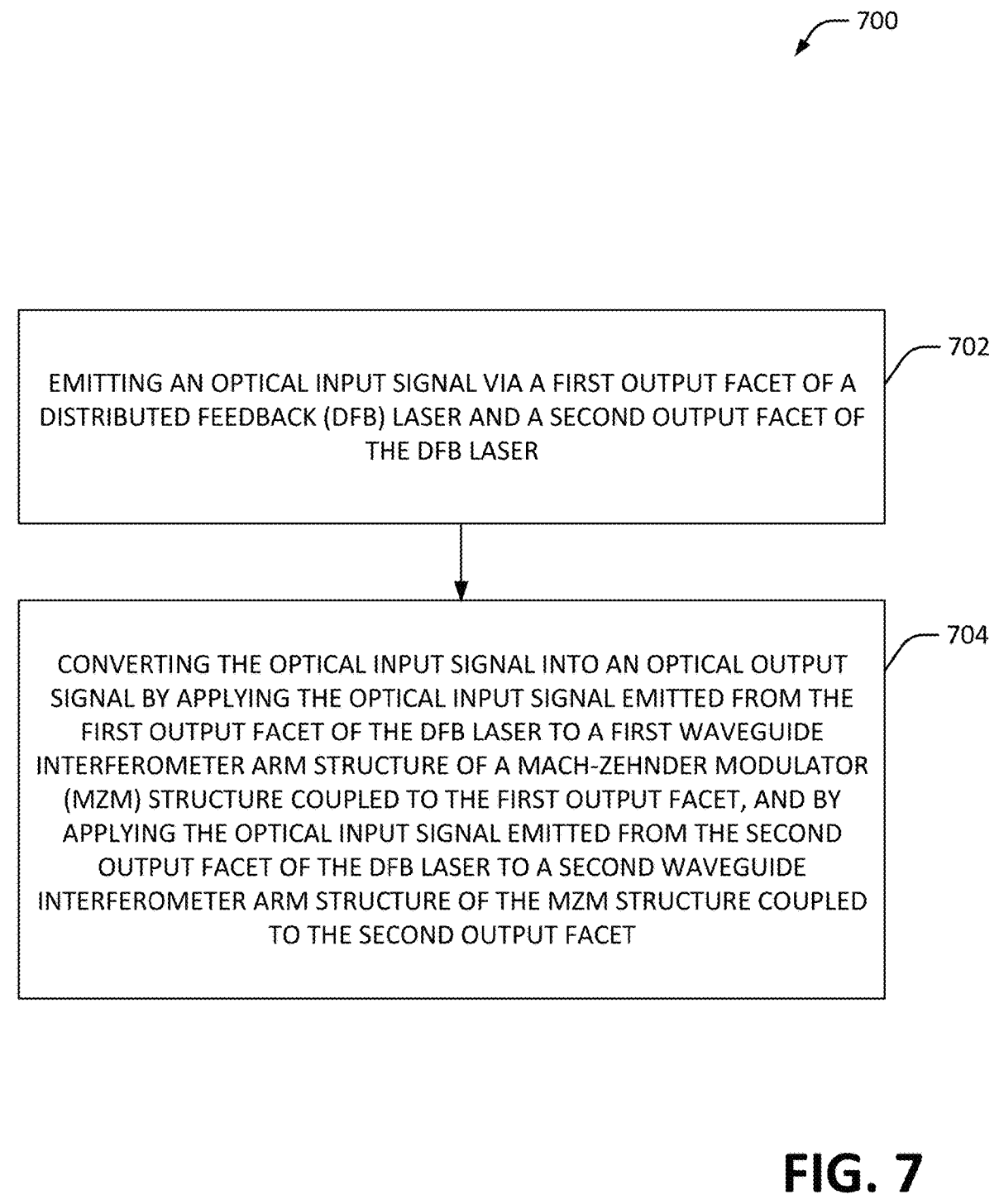

700

702

EMITTING AN OPTICAL INPUT SIGNAL VIA A FIRST OUTPUT FACET OF A DISTRIBUTED FEEDBACK (DFB) LASER AND A SECOND OUTPUT FACET OF THE DFB LASER

704

CONVERTING THE OPTICAL INPUT SIGNAL INTO AN OPTICAL OUTPUT SIGNAL BY APPLYING THE OPTICAL INPUT SIGNAL EMITTED FROM THE FIRST OUTPUT FACET OF THE DFB LASER TO A FIRST WAVEGUIDE INTERFEROMETER ARM STRUCTURE OF A MACH-ZEHNDER MODULATOR (MZM) STRUCTURE COUPLED TO THE FIRST OUTPUT FACET, AND BY APPLYING THE OPTICAL INPUT SIGNAL EMITTED FROM THE SECOND OUTPUT FACET OF THE DFB LASER TO A SECOND WAVEGUIDE INTERFEROMETER ARM STRUCTURE OF THE MZM STRUCTURE COUPLED TO THE SECOND OUTPUT FACET

FIG. 7

DUAL-FACET DISTRIBUTED FEEDBACK LASER IN MACH-ZEHNDER MODULATOR STRUCTURE

CROSS-REFERENCE TO RELATED APPLICATIONS

This application claims priority to Greek Patent Application No. 20220100403, filed May 17, 2022, the entire contents of which application are hereby incorporated herein by reference.

TECHNOLOGICAL FIELD

Embodiments of the present disclosure relate generally to optical communications such as, for example, optical communications related to transceivers for high-speed optical interconnects.

BACKGROUND

Optical communications have fundamentally enabled many advances in network systems over the past several decades. For example, because information no longer needs to be processed at the place at which it has been harvested or generated, information may be transported to dedicated locations for computation. As a result, cloud computing and edge computing are enabled and have changed the landscape of the Internet. The transfer of information between data centers or high-performance computing clusters (HPC), as well as intra-data center or intra-HPC, often leverages optical communication systems that require laser sources for generating the light channels. The light conveying the information may be generated either through external modulators (e.g., Mach-Zehnder modulators, micro-ring modulators, and/or electro-absorption modulated lasers (EMLs)) or directly by the same device that generates the light (e.g., directly modulated lasers (DMLs)) or by vertical cavity surface emitting lasers (VCSELs)). Applicant, however, has identified a number of deficiencies and problems associated with Mach-Zehnder modulators for optical communications. Through applied effort, ingenuity, and innovation, many of these identified problems have been solved by developing solutions that are included in embodiments of the present disclosure, many examples of which are described in detail herein.

BRIEF SUMMARY

Example embodiments described herein are directed to systems and methods for providing a dual-facet distributed feedback (DFB) laser in a Mach-Zehnder modulator (MZM) structure. The details of some embodiments of the subject matter described in this specification are set forth in the accompanying drawings and the description below. Other features, aspects, and advantages of the subject matter will become apparent from the description, the drawings, and the claims.

In an embodiment, a system comprises an MZM structure. The MZM structure comprises a DFB laser, a first waveguide interferometer arm structure, and a second waveguide interferometer arm structure. The DFB laser is configured to generate an optical input signal. Furthermore, the DFB laser comprises a first output facet and a second output facet. The first waveguide interferometer arm structure is coupled to the first output facet of the DFB laser. The first output facet of the DFB laser is configured to emit the optical input signal to the first waveguide interferometer arm structure. The second waveguide interferometer arm structure is coupled to the second output facet of the DFB laser. The second output facet of the DFB laser is configured to emit the optical input signal to the second waveguide interferometer arm structure. In one or more embodiments, the MZM structure is configured to convert the optical input signal into an optical output signal through application of the optical input signal emitted from the first output facet of the DFB laser to the first waveguide interferometer arm structure, and application of the optical input signal emitted from the second output facet of the DFB laser to the second waveguide interferometer arm structure.

In one or more embodiments, the MZM structure is configured to convert the optical input signal into the optical output signal through application of the optical input signal emitted from the first output facet of the DFB laser to a first electrode of the first waveguide interferometer arm structure, and application of the optical input signal emitted from the second output facet of the DFB laser to a second electrode of the second waveguide interferometer arm structure.

In one or more embodiments, the MZM structure is configured to convert the optical input signal into the optical output signal through application of the optical input signal emitted from the first output facet of the DFB laser to a first phase modulating electrode of the first waveguide interferometer arm structure, and application of the optical input signal emitted from the second output facet of the DFB laser to a second phase modulating electrode of the second waveguide interferometer arm structure.

In one or more embodiments, the MZM structure is configured to convert the optical input signal into the optical output signal through application of the optical input signal emitted from the first output facet of the DFB laser to a first intensity modulating electrode of the first waveguide interferometer arm structure, and application of the optical input signal emitted from the second output facet of the DFB laser to a second intensity modulating electrode of the second waveguide interferometer arm structure.

In one or more embodiments, the MZM structure is configured to convert the optical input signal into the optical output signal through application of the optical input signal emitted from the first output facet of the DFB laser to a first tunable optical filter of the first waveguide interferometer arm structure, and application of the optical input signal emitted from the second output facet of the DFB laser to a second tunable optical filter of the second waveguide interferometer arm structure.

In one or more embodiments, the MZM structure is a first MZM structure, the DFB laser is a first DFB laser, and the optical input signal is a first optical input signal. Additionally, in one or more embodiments, the system further comprises a second MZM structure. The second MZM structure comprises a second DFB laser, a third waveguide interferometer arm structure, and a fourth waveguide interferometer arm structure. The second DFB laser is configured to generate a second optical input signal. Furthermore, the second DFB laser comprises a first output facet and a second output facet. The third waveguide interferometer arm structure is coupled to the first output facet of the second DFB laser. The first output facet of the second DFB laser is configured to emit the second optical input signal to the third waveguide interferometer arm structure. The fourth waveguide interferometer arm structure is coupled to the second output facet of the second DFB laser. The second output facet of the second DFB laser is configured to emit the second optical input signal to the fourth waveguide interferometer arm structure. In one or more embodiments, the second MZM structure is configured to convert the second optical input signal into a second optical output signal through application of the second optical input signal emitted from the first output facet of the second DFB laser to the third waveguide interferometer arm structure, and application of the second optical input signal emitted from the second output facet of the second DFB laser to the fourth waveguide interferometer arm structure.

In one or more embodiments, the system further comprises a third MZM structure configured to combine the first optical output signal from the first MZM structure and the second optical output signal from the second MZM structure into a combined optical output signal.

In one or more embodiments, the system further comprises a coherent receiver configured to receive a combined optical output signal from the first MZM structure and the second MZM structure.

In one or more embodiments, the system further comprises a coherent receiver configured to receive respective optical output signals from the first MZM structure and the second MZM structure.

In one or more embodiments, the first MZM structure and the second MZM structure are integrated on a photonic integrated circuit.

In one or more embodiments, the optical output signal is an optical non-return-to-zero (NRZ) signal. In one or more alternative embodiments, the optical output signal is an optical pulse amplitude modulation (PAM) signal.

In another embodiment, a system comprises a DFB laser and an MZM structure. The DFB laser is configured to generate an optical input signal. Furthermore, the DFB laser comprises a first output facet and a second output facet. The MZM structure comprises a first waveguide interferometer arm structure and a second waveguide interferometer arm structure. The first waveguide interferometer arm structure is coupled to the first output facet of the DFB laser. The first output facet of the DFB laser is configured to emit the optical input signal to the first waveguide interferometer arm structure. The second waveguide interferometer arm structure coupled to the second output facet of the DFB laser. The second output facet of the DFB laser is configured to emit the optical input signal to the second waveguide interferometer arm structure. In one or more embodiments, the MZM structure is configured to convert the optical input signal into an optical output signal through application of the optical input signal emitted from the first output facet of the DFB laser to the first waveguide interferometer arm structure, and application of the optical input signal emitted from the second output facet of the DFB laser to the second waveguide interferometer arm structure, In one or more embodiments, the MZM structure is configured to convert the optical input signal into the optical output signal through application of the optical input signal emitted from the first output facet of the DFB laser to a first electrode of the first waveguide interferometer arm structure, and application of the optical input signal emitted from the second output facet of the DFB laser to a second electrode of the second waveguide interferometer arm structure.

In one or more embodiments, the MZM structure is configured to convert the optical input signal into the optical output signal through application of the optical input signal emitted from the first output facet of the DFB laser to a first phase modulating electrode of the first waveguide interferometer arm structure, and application of the optical input signal emitted from the second output facet of the DFB laser to a second phase modulating electrode of the second waveguide interferometer arm structure.

In one or more embodiments, the MZM structure is configured to convert the optical input signal into the optical output signal through application of the optical input signal emitted from the first output facet of the DFB laser to a first intensity modulating electrode of the first waveguide interferometer arm structure, and application of the optical input signal emitted from the second output facet of the DFB laser to a second intensity modulating electrode of the second waveguide interferometer arm structure.

In one or more embodiments, the MZM structure is configured to convert the optical input signal into the optical output signal through application of the optical input signal emitted from the first output facet of the DFB laser to a first tunable optical filter of the first waveguide interferometer arm structure, and application of the optical input signal emitted from the second output facet of the DFB laser to a second tunable optical filter of the second waveguide interferometer arm structure.

In one or more embodiments, the MZM structure is a first MZM structure, the DFB laser is a first DFB laser, and the optical input signal is a first optical input signal. Additionally, in one or more embodiments, the system further comprises a second DFB laser and a second MZM structure. The second DFB laser is configured to generate a second optical input signal. Additionally, the second DFB laser comprises a first output facet and a second output facet. The second MZM structure comprises a third waveguide interferometer arm structure and a fourth waveguide interferometer arm structure. The third waveguide interferometer arm structure coupled to the first output facet of the second DFB laser. The first output facet of the second DFB laser is configured to emit the second optical input signal to the third waveguide interferometer arm structure. The fourth waveguide interferometer arm structure is coupled to the second output facet of the second DFB laser. The second output facet of the second DFB laser is configured to emit the second optical input signal to the fourth waveguide interferometer arm structure. In one or more embodiments, the second MZM structure is configured to convert the second optical input signal into a second optical output signal through application of the second optical input signal emitted from the first output facet of the second DFB laser to the third waveguide interferometer arm structure, and application of the second optical input signal emitted from the second output facet of the second DFB laser to the fourth waveguide interferometer arm structure.

In yet another embodiment, a method is provided. The method provides for emitting an optical input signal via a first output facet of a DFB laser and a second output facet of the DFB laser. The method also provides for converting the optical input signal into an optical output signal by applying the optical input signal emitted from the first output facet of the DFB laser to a first waveguide interferometer arm structure of a Mach-Zehnder modulator (MZM) structure coupled to the first output facet, and by applying the optical input signal emitted from the second output facet of the DFB laser to a second waveguide interferometer arm structure of the MZM structure coupled to the second output facet.

In one or more embodiments, applying the optical input signal emitted from the first output facet of the DFB laser to the first waveguide interferometer arm structure comprises applying the optical input signal emitted from the first output facet of the DFB laser to a first electrode of the first waveguide interferometer arm structure, and applying the optical input signal emitted from the second output facet of the DFB laser to the second waveguide interferometer arm structure comprises applying the optical input signal emitted from the second output facet of the DFB laser to a second electrode of the second waveguide interferometer arm structure.

In one or more embodiments, applying the optical input signal emitted from the first output facet of the DFB laser to the first waveguide interferometer arm structure comprises applying the optical input signal emitted from the first output facet of the DFB laser to a first tunable optical filter of the first waveguide interferometer arm structure, and applying the optical input signal emitted from the second output facet of the DFB laser to the second waveguide interferometer arm structure comprises applying the optical input signal emitted from the second output facet of the DFB laser to a second tunable optical filter of the second waveguide interferometer arm structure.

BRIEF DESCRIPTION OF THE DRAWINGS

Figure 1:
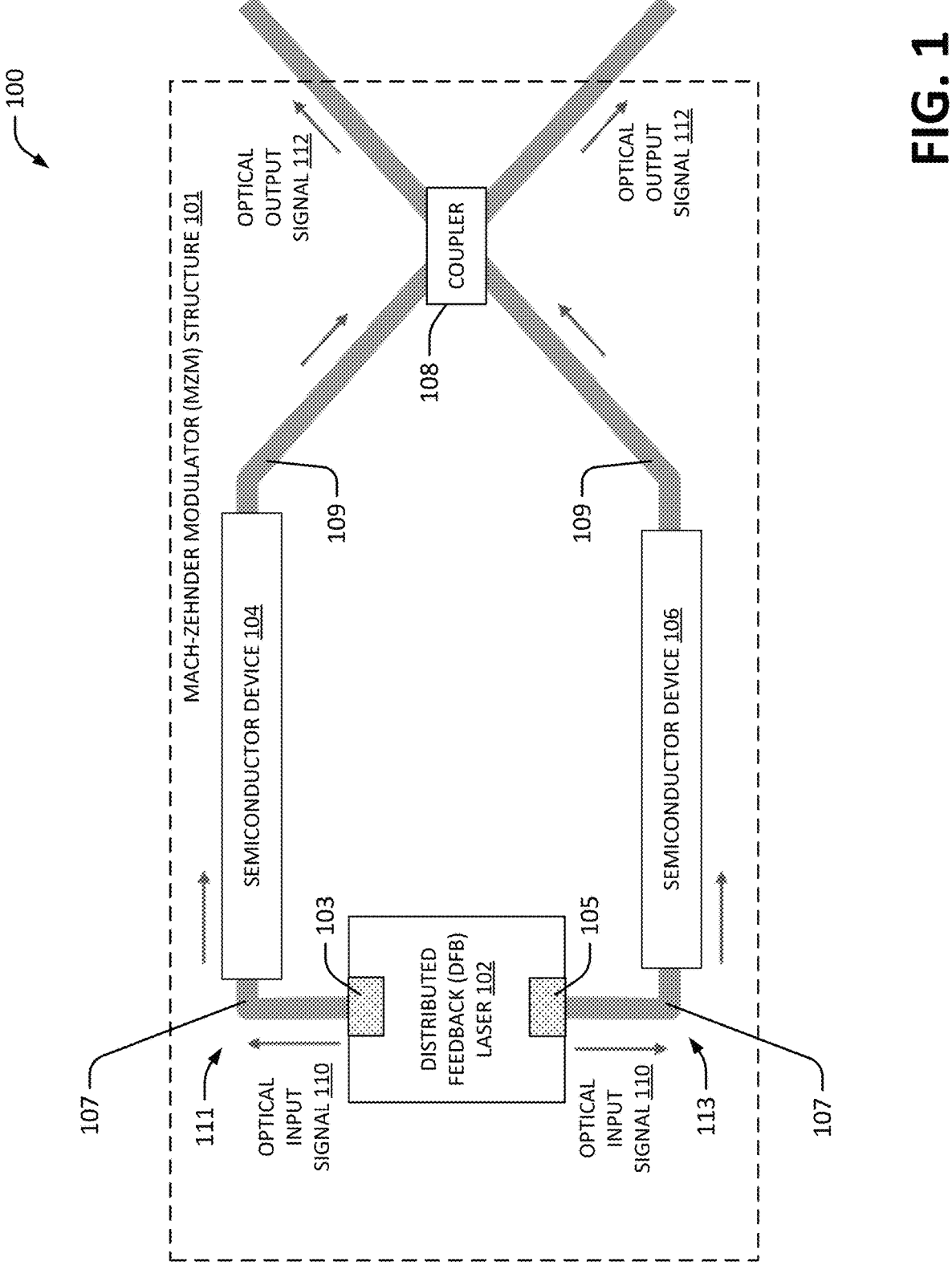
Figure 2:
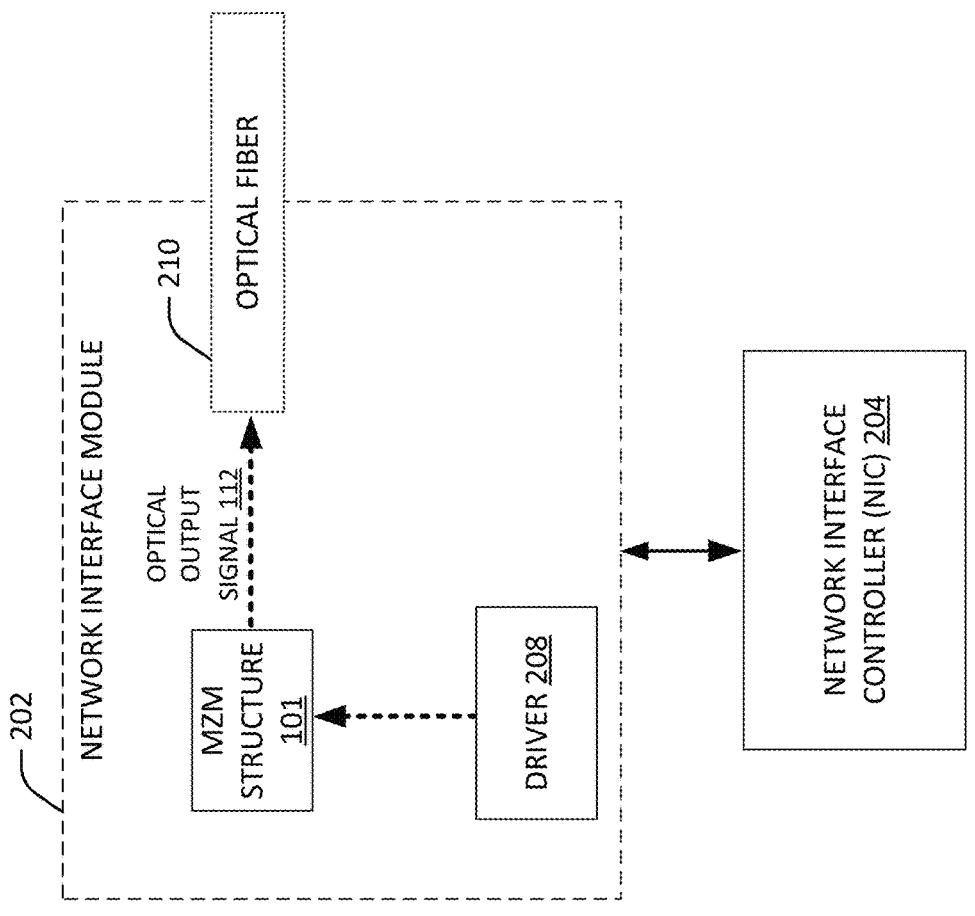
Figure 3:
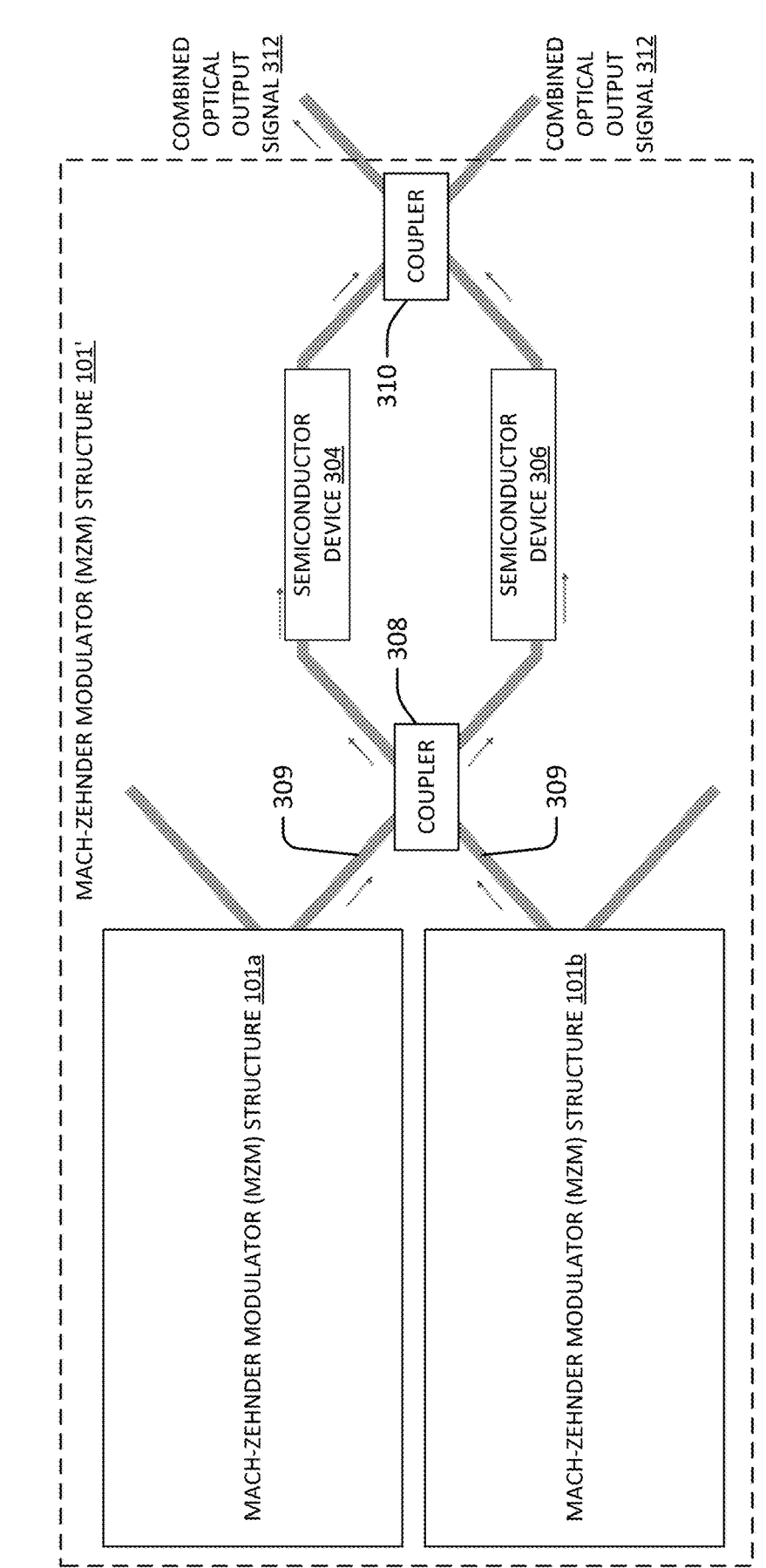
Figure 4:
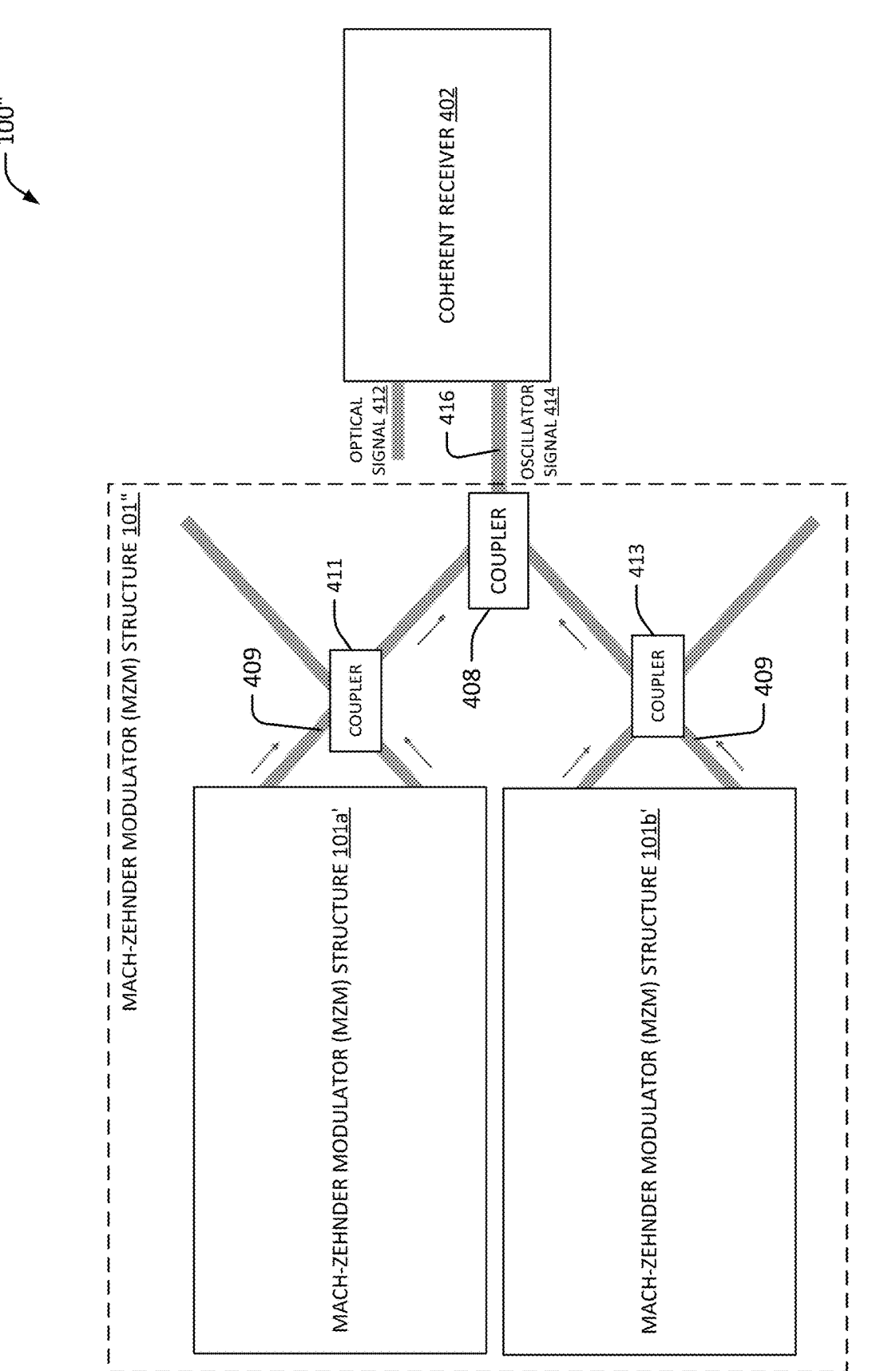
Figure 5:
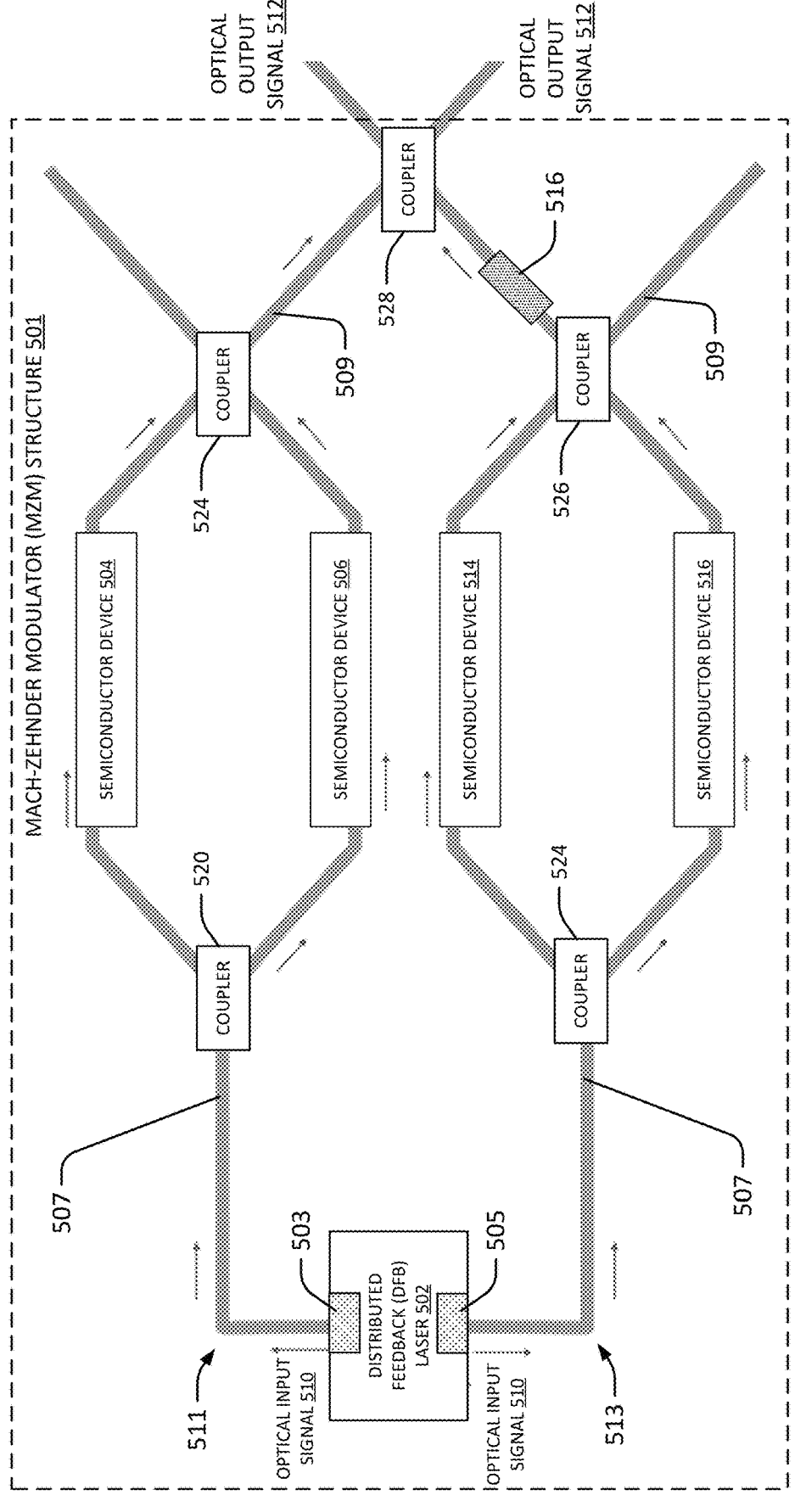
Figures 6A, 6B:
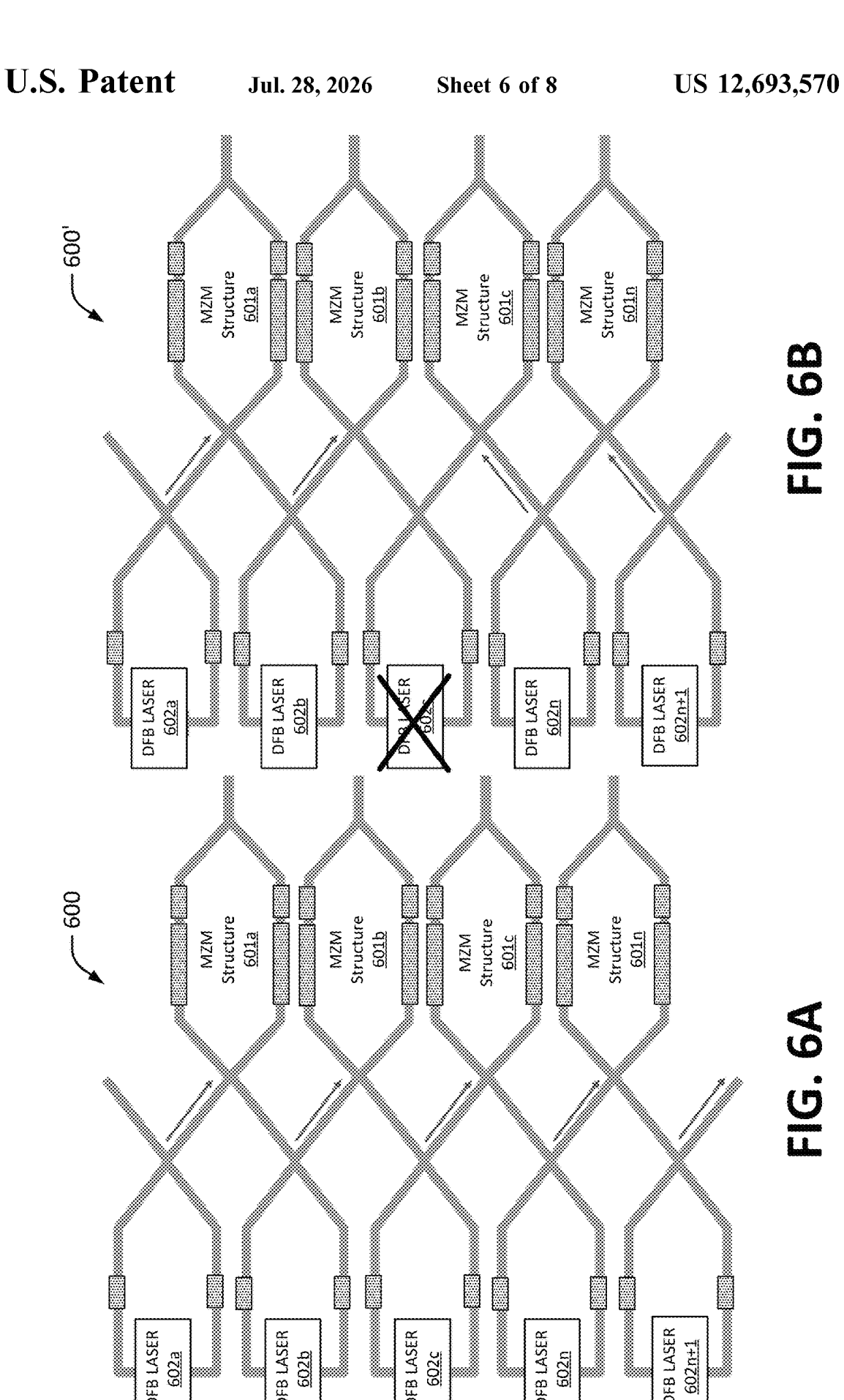
Figure 8:
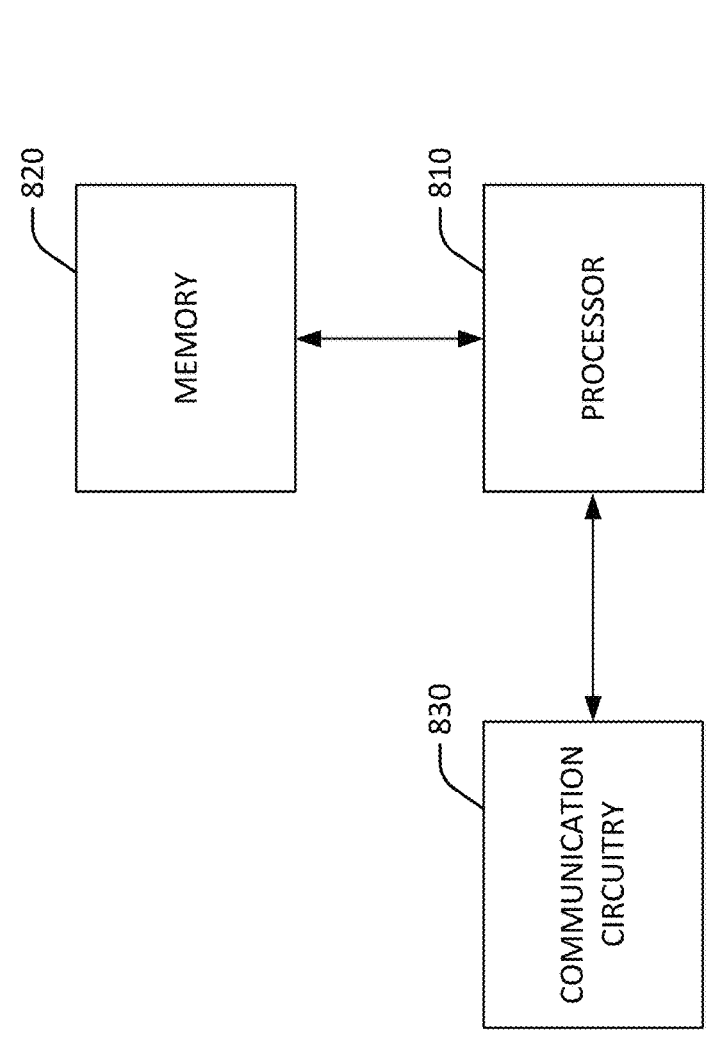

Having thus described the embodiments of the present disclosure in general terms, reference will now be made to the accompanying drawings, which are not necessarily drawn to scale, and wherein:

FIG. 1 illustrates an example optical communication system that includes a Mach-Zehnder modulator (MZM) structure, in accordance with one or more embodiments of the present disclosure;

FIG. 2 illustrates an example system that includes a network interface module and a network interface controller, in accordance with one or more embodiments of the present disclosure;

FIG. 3 illustrates another example optical communication system that includes an MZM structure, in accordance with one or more embodiments of the present disclosure;

FIG. 4 illustrates an example optical communication system that includes an MZM structure and a coherent receiver, in accordance with one or more embodiments of the present disclosure;

FIG. 5 illustrates another example optical communication system that includes an MZM structure, in accordance with one or more embodiments of the present disclosure;

FIG. 6A illustrates an example optical communication system that includes a group of MZM structures and a group of DFB lasers, in accordance with one or more embodiments of the present disclosure;

FIG. 6B illustrates an example optical communication system that includes a group of MZM structures, and a group of DFB lasers associated with a DFB laser failure, in accordance with one or more embodiments of the present disclosure;

FIG. 7 is a flowchart illustrating an example method for providing optical communications via a dual-facet DFB laser in an MZM structure, in accordance with one or more embodiments of the present disclosure; and FIG. 8 illustrates an example computing system that may be embedded in a communication system, in accordance with one or more embodiments of the present disclosure.

DETAILED DESCRIPTION

Overview

Example embodiments will now be described more fully hereinafter with reference to the accompanying drawings, in which some, but not all, embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "exemplary" and "example" as may be used herein are not provided to convey any qualitative assessment, but instead merely to convey an illustration of an example. Thus, use of any such terms should not be taken to limit the spirit and scope of embodiments of the present disclosure.

Optical communications have fundamentally enabled many advances in network systems over the past several decades. For example, because information no longer needs to be processed at the place at which it has been harvested or generated, information may be transported to dedicated locations for computation. As a result, cloud computing and edge computing are enabled and have changed the landscape of the Internet. The transfer of information between data centers or high-performance computing clusters (HPC), as well as intra-data center or intra-HPC, often leverages optical communication systems that require laser sources for generating the light channels. The light conveying the information may be generated either through external modulators (e.g., Mach-Zehnder modulators, micro-ring modulators, and/or electro-absorption modulated lasers (EMLs)) or directly by the same device that generates the light (e.g., directly modulated lasers (DMLs)) or by vertical cavity surface emitting lasers (VCSELs)).

Datacenters generally rely on a communication infrastructure that includes optical interconnects between hardware networking components. For example, a communication infrastructure may include optical interconnects between server racks and top-of-rack switches. Additionally or alternatively, a communication infrastructure may include optical interconnects between different tiers of network switches. In intra-datacenter communications, the distances between components are traditionally short (e.g., less than 10 km). As such, short-reach connections within a datacenter are often implemented with vertical-cavity surface-emitting lasers (VCSELs) connected to multimode fibers. Certain datacenters may alternatively employ single-mode optics. By way of example, single-mode optics for intra-datacenter communications generally employ electro-absorption modulated lasers (EMLs) integrated on an indium phosphide (InP) material. For single-mode optics, a distributed feedback (DFB) laser may also be integrated on a semiconductor die with, for example, an electro-absorption modulator (EAM). DFB lasers include an active region that contains a periodically structured element or diffraction grating to impose periodic changes in a refractive index of a waveguide. Certain datacenters may alternatively employ silicon photonics that employ a Mach-Zehnder modulator (MZM) for intra-datacenter communications. MZMs employed for intra-datacenter communications are generally configured as silicon photonic MZMs. Additionally, MZMs are typically connected to an external laser source or heterogeneously integrated with a laser source.

As bandwidth demand in datacenters persists, it is often desirable to similarly scale one or more of these technologies. As such, in certain implementations in order to satisfy bandwidth demand in datacenters, it is desirable to improve modulation components such as Mach-Zehnder modulators which typically offer larger bandwidth values compared to EMLs. Performance of photonic chip technologies in datacenters (e.g., InP EMLs and silicon ZMs), however, are often limited by electro-optic bandwidth of respective components. Additionally, optimization of energy consumption for a laser source employed for intra-datacenter communi-
cations is desirable to improve performance of datacenter
communication infrastructure.

Thus, to address these issues and others, the embodiments
of the present disclosure provide a dual-facet DFB laser in
an MZM structure. By employing a dual-facet DFB laser in
an MZM structure, improved optical communications in a
datacenter may be provided. Additionally or alternatively, by
employing a dual-facet DFB laser in an MZM structure,
performance of datacenter communication infrastructure
may be provided. In various embodiments, the MZM struc-
ture disclosed herein may provide energy-efficient photonic
integrated components (PICs) that combines DFB lasers and
modulators on the same chip. The MZM structure disclosed
herein with a dual-facet DFB laser may also be configured
as an optical chip circuit with improved optical power
characteristics as compared to traditional MZM structures.
In various embodiments, the combined design of the dual-
facet DFB laser with the MZM structure may be provided by
integrating the dual-facet DFB laser in an interferometer of
the MZM structure. An optical signal may therefore be
emitted by both facets of the DFB laser to provide the optical
signal into the MZM. In various embodiments, power con-
sumption of the DFB laser may be reduced by 50% or
approximately 50% as compared to traditional DFB lasers
employed for optical communications. The MZM structure
disclosed herein may also be integrated into a photonic chip
or a photonic integrated circuit.

Example MZM Structure

FIG. 1 illustrates a system 100 that facilitates optical
communications such as, for example, short-reach optical
communications according to one or more embodiments of
the present disclosure. In one or more embodiments, the
system 100 may be configured to generate an output optical
signal using a dual-facet DFB laser in an MZM structure. As
such, the system 100 may include an MZM structure 101 as
shown in FIG. 1. In one or more embodiments, the MZM
structure 101 may be a silicon photonic MZM. Additionally
or alternatively, the MZM structure 101 may be configured
as a modulator to convert one or more data streams from an
electrical domain to an optical domain. For example, in one
or more embodiments, the MZM structure 101 may be
configured as a modulator to convert one or more electrical
lanes into one or more optical lanes.

The MZM structure 101 includes a DFB laser 102, a
semiconductor device 104, a semiconductor device 106,
and/or a coupler 108. The DFB laser 102 may be a dual-facet
DFB laser 102 that includes a first output facet 103 and a
second output facet 105. The first output facet 103 may be
a front facet of the DFB laser 102 and the second output
facet 105 may be a back facet of the DFB laser 102.
Alternatively, the first output facet 103 may be a back facet
of the DFB laser 102 and the second output facet 105 may
be a front facet of the DFB laser 102. Furthermore, the first
output facet 103 and the second output facet 105 of the DFB
laser 102 may be light emitting regions of the DFB laser 102.
In one or more embodiments, the DFB laser 102 may be
configured as a light source to generate an optical input
signal 110. The optical input signal 110 may be, for example,
an optical signal associated with data for transmission via an
optical fiber. For example, in one or more embodiments, the
optical input signal 110 may be an unmodulated optical
carrier. In one or more embodiments, the DFB laser 102 may
emit the optical input signal 110 at a particular wavelength.
In certain embodiments, the DFB laser 102 may alternatively be implemented separate from the MZM structure
101. For example, in certain embodiments, the DFB laser
102 may alternatively be implemented separate from the
semiconductor device 104, the semiconductor 106, and/or
the coupler 108.

The optical input signal 110 may exit the DFB laser 102
via the first output facet 103 and the second output facet 105.
For instance, a waveguide of the DFB laser 102 may be
optically aligned with the first output facet 103 and the
second output facet 105 such that the optical input signal 110
transmitted via the waveguide may exit the DFB laser 102
via the first output facet 103 and the second output facet 105.
In various embodiments, the DFB laser 102 may include an
active region that contains a periodically structured element
or diffraction grating to impose periodic changes in a refrac-
tive index of the waveguide to facilitate emitting the optical
input signal 110 via the first output facet 103 and the second
output facet 105.

According to one feature of the present system, a first side
of the semiconductor device 104 and the semiconductor
device 106 are coupled via an input waveguide 107. Fur-
thermore, a second side of the semiconductor device 104 and
the semiconductor device 106 are coupled via an output
waveguide 109. In one or more embodiments, the input
waveguide 107 of the MZM structure 101 is configured to
receive the optical input signal 110. In an embodiment, the
semiconductor device 104, a top portion of the input wave-
guide 107, and a top portion of the output waveguide 109
may correspond to a first waveguide interferometer arm
structure 111 of the MZM structure 101. Furthermore, the
semiconductor device 106, a bottom portion of the input
waveguide 107, and a bottom portion of the output wave-
guide 109 may correspond to a second waveguide interfer-
ometer arm structure 113 of the MZM structure 101.

The first waveguide interferometer arm structure 111 may
be directly coupled to the first output facet 103 of the DFB
laser 102. For example, the top portion of the input wave-
guide 107 associated with the semiconductor device 104
may be directly coupled to the first output facet 103 of the
DFB laser 102. The first output facet 103 of the DFB laser
102 may therefore emit the optical input signal 110 to the
first waveguide interferometer arm structure 111. Although
described herein with reference to a direct coupling of the
first output facet 103 of the DFB laser 102 and the first
waveguide interferometer arm structure 111, the present
disclosure contemplates that such a coupling may refer to
any connection by which optical signals may propagate
between the first output facet 103 of the DFB laser 102 and
the first waveguide interferometer arm structure 111. Addi-
tionally, the second waveguide interferometer arm structure
113 may be directly coupled to the second output facet 105
of the DFB laser 102. For example, the bottom portion of the
input waveguide 107 associated with the semiconductor
device 106 may be directly coupled to the first output facet
105 of the DFB laser 102. The second output facet 105 of the
DFB laser 102 may therefore emit the optical input signal
110 to the second waveguide interferometer arm structure
113. Accordingly, with the MZM structure 101 of the present
application, the optical input signal 110 may be simultane-
ously or approximately simultaneously provided to the first
waveguide interferometer arm structure 111 and the second
waveguide interferometer arm structure 113 via the first
output facet 103 and the second output facet 105, respec-
tively. Although described herein with reference to a direct
coupling of the second output facet 105 of the DFB laser 102
and the second waveguide interferometer arm structure 113,
the present disclosure contemplates that such a coupling may refer to any connection by which optical signals may propagate between the second output facet 105 of the DFB laser 102 and the second waveguide interferometer arm structure 113.

The MZM structure 101 may be configured to convert the optical input signal 110 into an optical output signal 112 through application of the optical input signal 110 emitted from the first output facet 103 of the DFB laser 102 to the first waveguide interferometer arm structure 111, and further application of the optical input signal 110 emitted from the second output facet 105 of the DFB laser 102 to the second waveguide interferometer arm structure 113. The input waveguide 107 and/or the output waveguide 109 may be optical waveguides. For example, the input waveguide 107 and/or the output waveguide 109 may include a core and/or a cladding. Light may be transmitted via the core of the input waveguide 107 and/or the output waveguide 109. Furthermore, the cladding of the input waveguide 107 and/or the output waveguide 109 may be a surrounding medium for the core that is not associated with transmission of light. The core of the input waveguide 107 and/or the output waveguide 109 may include a higher index of refraction than the cladding, such that, in operation, light is directed by the cladding back toward the core, and light is thereby propagated through the waveguide. In an embodiment, the core of the input waveguide 107 and/or the output waveguide 109 may be formed of, include, or otherwise comprise silicon. Additionally, the cladding of the input waveguide 107 and/or the output waveguide 109 may include silicon dioxide or silicon nitride. However, it is to be appreciated that, in certain embodiments, the core and/or the cladding of the input waveguide 107 and/or the output waveguide 109 may comprise a different type of material such that the core comprises a higher index of refraction than the cladding. In one or more embodiments, the input waveguide 107 and/or the output waveguide 109 may be patterned into a silicon layer of the MZM structure 101.

The semiconductor device 104 of the first waveguide interferometer arm structure 111 may be configured as a top arm phase shifter of the MZM structure 101 and the semiconductor device 106 of the second waveguide interferometer arm structure 113 may be configured as a bottom arm phase shifter of the MZM structure 101. In one or more embodiments, the semiconductor device 104 may comprise first semiconductor material associated with a first doped region of the MZM structure 101 and the semiconductor device 106 may comprise second semiconductor material associated with a second doped region of the MZM structure 101. For example, in one or more embodiments, the first semiconductor material of the semiconductor device 104 may be formed of, include, or otherwise comprise silicon (e.g., doped silicon), silicon dioxide, silicide, and/or a metal. Furthermore, in one or more embodiments, the second semiconductor material of the semiconductor device 106 may be formed of, include, or otherwise comprise silicon (e.g., doped silicon), silicon dioxide, silicide and/or a metal. In certain embodiments, the semiconductor device 104 may include a first set of electrodes, and the semiconductor device 106 may include a second set of electrodes. In an embodiment, the first waveguide interferometer arm structure 111 and the second waveguide interferometer arm structure 113 may be configured with corresponding arm lengths. In another embodiment, arm lengths of the first waveguide interferometer arm structure 111 and the second waveguide interferometer arm structure 113 may be different. In certain embodiments, the semiconductor device 104 may include one or more electrodes, one or more phase shifters, and/or one or more bias components. Furthermore, in certain embodiments, the semiconductor device 106 may also include one or more electrodes, one or more phase shifters, and/or one or more bias components.

In an embodiment, the MZM structure 101 may be configured to convert the optical input signal 110 into the optical output signal 112 through application of the optical input signal 110 emitted from the first output facet 103 of the DFB laser 102 to the semiconductor device 104 of the first waveguide interferometer arm structure 111, and further application of the optical input signal 110 emitted from the second output facet 105 of the DFB laser 103 to the semiconductor device 106 of the second waveguide interferometer arm structure 113. The semiconductor device 104 and/or the semiconductor device 106 may be configured as an electrode (e.g., a phase modulating electrode, an intensity modulating electrode, or another type of electrode), a tunable optical filter (e.g., a microring modulator or another type of tunable optical filter), or another type of semiconductor device to provide for modulation of the optical input signal 110 emitted from the first output facet 103 and the second output facet 105.

In an example, the MZM structure 101 may be configured to convert the optical input signal 110 into the optical output signal 112 through application of the optical input signal 110 emitted from the first output facet 103 of the DFB laser 102 to at least a first electrode of the first waveguide interferometer arm structure 111, and further application of the optical input signal 110 emitted from the second output facet 105 of the DFB laser 103 to at least a second electrode of the second waveguide interferometer arm structure 113. In another example, the MZM structure 101 may be configured to convert the optical input signal 110 into the optical output signal 112 through application of the optical input signal 110 emitted from the first output facet 103 of the DFB laser 102 to at least a first phase modulating electrode of the first waveguide interferometer arm structure 111, and further application of the optical input signal 110 emitted from the second output facet 105 of the DFB laser 103 to at least a second phase modulating electrode of the second waveguide interferometer arm structure 113. In yet another example, the MZM structure 101 may be configured to convert the optical input signal 110 into the optical output signal 112 through application of the optical input signal 110 emitted from the first output facet 103 of the DFB laser 102 to at least a first intensity modulating electrode of the first waveguide interferometer arm structure 111, and further application of the optical input signal 110 emitted from the second output facet 105 of the DFB laser 103 to at least a second intensity modulating electrode of the second waveguide interferometer arm structure 113. In yet another example, the MZM structure 101 may be configured to convert the optical input signal 110 into the optical output signal 112 through application of the optical input signal 110 emitted from the first output facet 103 of the DFB laser 102 to at least a first tunable optical filter of the first waveguide interferometer arm structure 111, and further application of the optical input signal 110 emitted from the second output facet 105 of the DFB laser 103 to at least a second tunable optical filter of the second waveguide interferometer arm structure 113.

In certain embodiments, the output waveguide 109 may include the coupler 108 to couple respective signals from the first waveguide interferometer arm structure 111 and the second waveguide interferometer arm structure 113 to provide the optical output signal 112. The coupler 108 may be an optical coupler, such as a multi-mode interference (MMI) coupler, a directional coupler, a grating coupler, or another type of coupler configured to generate interference between respective signals from the first waveguide interferometer arm structure 111 and the second waveguide interferometer arm structure 113 to provide the optical output signal 112. As illustrated in FIG. 1, the coupler 108 is configured as a 2:2 coupler with two (2) output ports to provide the optical output signal 112. However, it is to be appreciated that, in certain embodiments, the coupler 108 may be configured as a 2:1 coupler with a single (1) output port to provide the optical output signal 112.

The optical output signal 112 may be an intensity modulated signal and/or a phase modulated signal. In certain embodiments, the optical output signal 112 may be an optical pulse amplitude modulation (PAM) signal such as, for example, an optical PAM-4 signal or another type of PAM-N signal, where N is a positive integer. An optical PAM-4 signal may be an optical pulse amplitude modulation signal that encodes information via pulse amplitude modulation associated with four levels. For example, an optical PAM-4 signal may be an optical pulse amplitude modulation signal that encodes information in the form of amplitude levels that represent 0, 1, 2, and 3. In certain embodiments, the optical output signal 112 may alternatively be an optical non-return-to-zero (NRZ) signal. An optical NRZ signal may be an optical modulation signal that encodes information via binary code represented based on a first signal condition (e.g., a positive voltage) and a second signal condition (e.g., a negative voltage). However, it is to be appreciated that, in certain embodiments, the optical output signal 112 may be configured as a different type of optical modulation signal. In certain embodiments, the optical output signal 112 may be dependent on a driving signal of the Mach Zehnder arms of the MZM structure 101.

With traditional MZM structures, light from an external laser is split into two arms of an interferometer of the MZM structure. In contrast, with the MZM structure 101 of the present application, the laser (e.g., the DFB laser 102) is integrated into the interferometer structure. Since the optical input signal 110 provided to the first waveguide interferometer arm structure 111 and the second waveguide interferometer arm structure 113 originate from the same laser (e.g., the DFB laser 102), both signal tributaries within the MZM structure 101 for the optical input signal 110 are phase-coherent. Additionally, in certain embodiments, relative phase between the optical input signal 110 provided to the first waveguide interferometer arm structure 111 and the second waveguide interferometer arm structure 113 may be adjusted via a phase shifter to bias the first waveguide interferometer arm structure 111 and the second waveguide interferometer arm structure 113 at a desired operating point. In various embodiments, optical power at an output of the MZM structure 101 may be doubled by employing the same laser (e.g., the DFB laser 102), as compared to traditional MZM structures.

FIG. 2 illustrates a system 200 that facilitates optical communications such as, for example, short-reach optical communications according to one or more embodiments of the present disclosure. The system 200 includes a network interface module 202 and/or a network interface controller (NIC) 204. The network interface module 202 may include the MZM structure 101 and/or a driver 208. Furthermore, in one or more embodiments, the network interface module 202 may include and/or may be configured to couple to an optical fiber 210. The network interface module 202 may be, for example, a transceiver device (e.g., an optical transceiver) that facilitates fiber optic communication. In one or more embodiments, the network interface module 202 may be a pluggable optical transceiver with a set of pins to facilitate connection with the optical fiber 210. The optical fiber 210 may be, for example, a fiber optic communication channel (e.g., a transparent fiber optic connection, a fiber optic wire, etc.) that transmits pulses of infrared light associated with the optical output signal 112.

In an embodiment, the optical fiber 210 includes a single optical communication channel (e.g., a single fiber optic wire). In another embodiment, the optical fiber 210 includes two or more optical communication channels (e.g., two or more fiber optic wires). In another embodiment, the optical fiber 210 may include, additionally or alternatively, a fiber bundle. However, it is to be appreciated that, in certain embodiments, the optical fiber 210 may be implemented in a different manner to facilitate fiber optic communications via the optical fiber 210. In certain embodiments, the optical fiber 210 may be a single mode optical fiber cable. Alternatively, in certain embodiments, the optical fiber 210 may be a multimode optical fiber cable. However, it is to be appreciated that, in certain embodiments, the optical fiber 210 may be implemented as a different type of optical fiber.

In an embodiment, the NIC 204 may be coupled (e.g., physically coupled and/or communicatively coupled) to the network interface module 202. In another embodiment, the network interface module 202 may include the NIC 204. In an embodiment, the NIC 204 may be configured to manage generation of the optical input signal 110 via the DFB laser 102 of the MZM structure 101. For example, in an embodiment, the NIC 204 may be configured to control emission of the optical input signal 110 via the DFB laser 102 of the MZM structure 101. In certain embodiments, the NIC 204 may be configured to manage timing of transmission of the optical input signal 110. In another embodiment, the NIC 204 may be configured to select the optical input signal 110 for transmission. In one or more embodiments, the NIC 204 may be configured to manage one or more inputs provided to the DFB laser 102 of the MZM structure 101 and/or one or more settings for the DFB laser 102 of the MZM structure 101 to facilitate emission of the optical input signal 110 via the DFB laser 102 of the MZM structure 101. The optical input signal 110 may be, for example, an optical signal associated with data for transmission via the optical fiber 210. For example, in one or more embodiments, the optical input signal 110 may be an unmodulated optical carrier. In an embodiment, the MZM structure 101 may be attached to a substrate such as, for example, a printed circuit board of the network interface module 202.

Additionally or alternatively, in an embodiment, the NIC 204 may be configured to manage generation of one or more electrical driver signals for the MZM structure 101 via the driver 208. In certain embodiments, the NIC 204 may be configured as a bias controller for the network interface module 202. For example, in certain embodiments, the NIC 204 may be configured as a bias controller to control a degree of bias provided by the one or more electrical driver signals for the MZM structure 101. In one or more embodiments, the NIC 204 may be configured to manage one or more inputs provided to the driver 208 and/or one or more settings for the driver 208 to facilitate generation of the one or more electrical driver signals via the driver 208. In one or more embodiments, the NIC 204 may configure the one or more electrical driver signals to bias the MZM structure 101 at a certain operating point for the MZM structure 101.

In one or more embodiments, control from the NIC 204 to the network interface module 202 may be realized based on an electrical lane control signal and/or by sending one or more different data streams to the DFB laser 102 of the MZM structure 101 and/or the driver 208. In one or more embodiments, the NIC 204 may transmit one or more control signals (e.g., one or more electrical control signals) to the DFB laser 102 of the MZM structure 101 to facilitate emission of the optical input signal 110. In one or more embodiments, the NIC 204 may additionally or alternatively configure the DFB laser 102 of the MZM structure 101 with certain data to facilitate emission of the optical input signal 110. Additionally or alternatively, in one or more embodiments, the NIC 204 may transmit one or more control signals (e.g., one or more electrical control signals) to the driver 208 to facilitate generation of the one or more electrical driver signals for the MZM structure 101.

FIG. 3 illustrates a system 100' that facilitates optical communications such as, for example, short-reach optical communications according to one or more embodiments of the present disclosure. The system 100' may be an alternate embodiment of the system 100. The system 100' includes a MZM structure 101'. The MZM structure 101' may be an alternate embodiment of the MZM structure 101. For example, the MZM structure 101' may be a silicon photonic MZM that converts one or more optical input signals into a combined optical output signal 312. The MZM structure 101' may include two or more of the MZM structures 101. For example, the MZM structure 101' may include a MZM structure 101a that corresponds to the MZM structure 101 and a MZM structure 101b that corresponds to the MZM structure 101. The MZM structure 101a may include the DFB laser 102, the semiconductor device 104 and the semiconductor device 106 as shown in FIG. 1. Additionally, the MZM structure 101b may similarly include the DFB laser 102, the semiconductor device 104 and the semiconductor device 106 as shown in FIG. 1. Although described herein with reference to an alternative embodiment system 100', one or more components and/or the functionality thereof may be provided in whole or in part with any other embodiment described herein.

In an embodiment, the MZM structure 101a may be a first MZM structure that includes a first DFB laser (e.g., the DFB laser 102) configured to generate a first optical input signal (e.g., the optical input signal 110). Additionally, the MZM structure 101a may include a first waveguide interferometer arm structure (e.g., the first waveguide interferometer arm structure 111) directly coupled to a first output facet (e.g., the first output facet 103) of the first DFB laser. The first output facet of the first DFB laser may be configured to emit the first optical input signal to the first waveguide interferometer arm structure of the MZM structure 101a. Although described herein with reference to a direct coupling of the first output facet of the first DFB laser and the first waveguide interferometer arm structure, the present disclosure contemplates that such a coupling may refer to any connection by which optical signals may propagate between the first output facet of the first DFB laser and the first waveguide interferometer arm structure. The MZM structure 101a may also include a second waveguide interferometer arm structure (e.g., the second waveguide interferometer arm structure 113) directly coupled to a second output facet (e.g., the second output facet 105) of the first DFB laser. The second output facet of the first DFB laser may be configured to emit the first optical input signal to the second waveguide interferometer arm structure of the MZM structure 101a. Moreover, the MZM structure 101a may be configured to convert the first optical input signal into a first optical output signal through application of the first optical input signal emitted from the first output facet of the first DFB laser to the first waveguide interferometer arm structure, and application of the first optical input signal emitted from the second output facet of the first DFB laser to the second waveguide interferometer arm structure. Although described herein with reference to a direct coupling of the second output facet of the first DFB laser and the second waveguide interferometer arm structure, the present disclosure contemplates that such a coupling may refer to any connection by which optical signals may propagate between the second output facet of the first DFB laser and the second waveguide interferometer arm structure.

The MZM structure 101b may be a second MZM structure that includes a second DFB laser (e.g., the DFB laser 102) configured to generate a second optical input signal (e.g., the optical input signal 110). Additionally, the MZM structure 101b may include a third waveguide interferometer arm structure (e.g., the first waveguide interferometer arm structure 111) directly coupled to a first output facet (e.g., the first output facet 103) of the second DFB laser. The first output facet of the second DFB laser may be configured to emit the second optical input signal to the third waveguide interferometer arm structure of the MZM structure 101b. Although described herein with reference to a direct coupling of the first output facet of the second DFB laser and the first waveguide interferometer arm structure, the present disclosure contemplates that such a coupling may refer to any connection by which optical signals may propagate between the first output facet of the second DFB laser and the first waveguide interferometer arm structure. The MZM structure 101b may also include a fourth waveguide interferometer arm structure (e.g., the second waveguide interferometer arm structure 113) directly coupled to a second output facet (e.g., the second output facet 105) of the second DFB laser. The second output facet of the second DFB laser may be configured to emit the second optical input signal to the second waveguide interferometer arm structure of the MZM structure 101b. Moreover, the MZM structure 101b may be configured to convert the second optical input signal into a second optical output signal through application of the second optical input signal emitted from the first output facet of the second DFB laser to the third waveguide interferometer arm structure, and application of the second optical input signal emitted from the second output facet of the second DFB laser to the fourth waveguide interferometer arm structure. Although described herein with reference to a direct coupling of the second output facet of the second DFB laser and the second waveguide interferometer arm structure, the present disclosure contemplates that such a coupling may refer to any connection by which optical signals may propagate between the second output facet of the second DFB laser and the second waveguide interferometer arm structure.

In an aspect, the MZM structure 101a and the MZM structure 101b may be coupled via an output waveguide 309 and/or a coupler 308. The output waveguide 309 may be optical waveguides. For example, the output waveguide 309 may include a core and/or a cladding. Light may be transmitted via the core of the output waveguide 309. Furthermore, the cladding of the output waveguide 309 may be a surrounding medium for the core that is not associated with transmission of light. The core of the output waveguide 309 may comprise a higher index of refraction than the cladding, such that, in operation, light is directed by the cladding back toward the core and, light is thereby propagated through the waveguide. In an embodiment, the core of the output waveguide 309 may be formed of, include, or otherwise comprise silicon. Additionally, the cladding of the output waveguide 309 may include silicon dioxide or silicon nitride. However, it is to be appreciated that, in certain embodiments, the core and/or the cladding of the output waveguide 309 may comprise a different type of material such that the core comprises a higher index of refraction than the cladding. In one or more embodiments, the output waveguide 309 may be patterned into a silicon layer of the MZM structure 101'. The coupler 308 may be an optical coupler such as an MIMI coupler, a directional coupler, a grating coupler, or another type of coupler configured to generate interference between respective signals from the MZM structure 101a and the MZM structure 101b. For example, the coupler 308 may be configured to combine the first optical output signal from the MZM structure 101a and the second optical output signal from the second MZM structure 101b. As illustrated in FIG. 3, the coupler 308 is configured as a 2:2 coupler with two (2) output ports. However, it is to be appreciated that, in certain embodiments, the coupler 308 may be configured as a 2:1 coupler with a single (1) output port.

In one or more embodiments, the MZM structure 100' may additionally include a semiconductor device 304 and a semiconductor device 306. The semiconductor device 304 and the semiconductor device 306 may be configured as a third MZM structure. For example, the semiconductor device 304 and the semiconductor device 306 (e.g., the third MZM structure) may be configured to combine the first optical output signal from the MZM structure 101a and the second optical output signal from the second MZM structure 101b into the combined optical output signal 312. In certain embodiments, to facilitate generation of the combined optical output signal 312, the MZM structure 100' may additionally include a coupler 310. The coupler 310 may be an optical coupler such as an MIMI coupler, a directional coupler, a grating coupler, or another type of coupler configured to generate interference between respective signals from the semiconductor device 304 and the semiconductor 306. As illustrated in FIG. 3, the coupler 310 is configured as a 2:2 coupler with two (2) output ports. However, it is to be appreciated that, in certain embodiments, the coupler 310 may be configured as a 2:1 coupler with a single (1) output port. The combined optical output signal 312 may be an intensity modulated signal and/or a phase modulated signal. In certain embodiments, the combined optical output signal 312 may be an optical PAM signal such as, for example, an optical PAM-4 signal or another type of PAM-N signal. In certain embodiments, the combined optical output signal 312 may alternatively be an optical NRZ signal. However, it is to be appreciated that, in certain embodiments, the combined optical output signal 312 may be configured as a different type of optical modulation signal.

FIG. 4 illustrates a system 100" that facilitates optical communications such as, for example, short-reach optical communications according to one or more embodiments of the present disclosure. The system 100" may be an alternate embodiment of the system 100 and/or the system 100'. The system 100" includes a MZM structure 101". The MZM structure 101" may be an alternate embodiment of the MZM structure 101. For example, the MZM structure 101" may be a silicon photonic MZM that converts one or more optical input signals into an oscillator signal 412. In one or more embodiments, the oscillator signal 412 is a local oscillator signal. The MZM structure 101" may include two or more of the MZM structures 101. For example, the MZM structure 101" may include a MZM structure 101a' that corresponds to the MZM structure 101 and a MZM structure 101b' that corresponds to the MZM structure 101. The MZM structure 101a' may include the DFB laser 102, the semiconductor device 104 and the semiconductor device 106 as shown in FIG. 1. Additionally, the MZM structure 101b' may similarly include the DFB laser 102, the semiconductor device 104 and the semiconductor device 106 as shown in FIG. 1. Although described herein with reference to an alternative embodiment system 100", one or more components and/or the functionality thereof may be provided in whole or in part with any other embodiment described herein.

In an embodiment, the MZM structure 101a' may be a first MZM structure that includes a first DFB laser (e.g., the DFB laser 102) configured to generate a first optical input signal (e.g., the optical input signal 110). Additionally, the MZM structure 101a' may include a first waveguide interferometer arm structure (e.g., the first waveguide interferometer arm structure 111) directly coupled to a first output facet (e.g., the first output facet 103) of the first DFB laser. The first output facet of the first DFB laser may be configured to emit the first optical input signal to the first waveguide interferometer arm structure of the MZM structure 101a'. Although described herein with reference to a direct coupling of the first output facet of the first DFB laser 102 and the first waveguide interferometer arm structure, the present disclosure contemplates that such a coupling may refer to any connection by which optical signals may propagate between the first output facet of the first DFB laser and the first waveguide interferometer arm structure. The MZM structure 101a' may also include a second waveguide interferometer arm structure (e.g., the second waveguide interferometer arm structure 113) directly coupled to a second output facet (e.g., the second output facet 105) of the first DFB laser. The second output facet of the first DFB laser may be configured to emit the first optical input signal to the second waveguide interferometer arm structure of the MZM structure 101a'. Moreover, the MZM structure 101a' may be configured to convert the first optical input signal into a first optical output signal through application of the first optical input signal emitted from the first output facet of the first DFB laser to the first waveguide interferometer arm structure, and application of the first optical input signal emitted from the second output facet of the first DFB laser to the second waveguide interferometer arm structure. Although described herein with reference to a direct coupling of the second output facet of the first DFB laser and the second waveguide interferometer arm structure, the present disclosure contemplates that such a coupling may refer to any connection by which optical signals may propagate between the second output facet of the first DFB laser and the second waveguide interferometer arm structure.

The MZM structure 101b' may be a second MZM structure that includes a second DFB laser (e.g., the DFB laser 102) configured to generate a second optical input signal (e.g., the optical input signal 110). Additionally, the MZM structure 101b' may include a third waveguide interferometer arm structure (e.g., the first waveguide interferometer arm structure 111) directly coupled to a first output facet (e.g., the first output facet 103) of the second DFB laser. Although described herein with reference to a direct coupling of the first output facet of the second DFB laser and the third waveguide interferometer arm structure, the present disclosure contemplates that such a coupling may refer to any connection by which optical signals may propagate between the first output facet of the second DFB laser and the third waveguide interferometer arm structure 111. The first output facet of the second DFB laser may be configured to emit the second optical input signal to the third waveguide interferometer arm structure of the MZM structure 101b'. The MZM structure 101b' may also include a fourth waveguide interferometer arm structure (e.g., the second wave-guide interferometer arm structure 113) directly coupled to a second output facet (e.g., the second output facet 105) of the second DFB laser. The second output facet of the second DFB laser may be configured to emit the second optical input signal to the fourth waveguide interferometer arm structure of the MZM structure 101$b$'. Moreover, the MZM structure 101$b$' may be configured to convert the second optical input signal into a second optical output signal through application of the second optical input signal emit-ted from the first output facet of the second DFB laser to the third waveguide interferometer arm structure, and applica-tion of the second optical input signal emitted from the second output facet of the second DFB laser to the fourth waveguide interferometer arm structure. Although described herein with reference to a direct coupling of the second output facet of the second DFB laser and the fourth wave-guide interferometer arm structure, the present disclosure contemplates that such a coupling may refer to any connec-tion by which optical signals may propagate between the second output facet of the second DFB laser and the fourth waveguide interferometer arm structure.

In an aspect, the MZM structure 101$a$' and the MZM structure 101$b$' may be coupled via an output waveguide 409 and/or a coupler 408. The output waveguide 409 may be optical waveguides. For example, the output waveguide 409 may include a core and/or a cladding. Light may be trans-mitted via the core of the output waveguide 409. Further-more, the cladding of the output waveguide 409 may be a surrounding medium for the core that is not associated with transmission of light. The core of the output waveguide 409 may comprise a higher index of refraction than the cladding, such that, in operation, light is directed by the cladding back toward the core and, light is thereby propagated through the waveguide. In an embodiment, the core of the output wave-guide 409 may be formed of, include, or otherwise comprise silicon. Additionally, the cladding of the output waveguide 409 may include silicon dioxide or silicon nitride. However, it is to be appreciated that, in certain embodiments, the core and/or the cladding of the output waveguide 409 may comprise a different type of material such that the core comprises a higher index of refraction than the cladding. In one or more embodiments, the output waveguide 409 may be patterned into a silicon layer of the MZM structure 101".

The coupler 408 may be an optical coupler such as an MMI coupler, a directional coupler, a grating coupler, or another type of coupler configured to generate interference between respective signals from the MZM structure 101$a$' and the MZM structure 101$b$'. For example, the coupler 408 may be configured to combine the first optical output signal from the MZM structure 101$a$' and the second optical output signal from the second MZM structure 101$b$'. As illustrated in FIG. 4, the coupler 408 is configured as a 2:1 coupler with a single output (1) port. However, it is to be appreciated that, in certain embodiments, the coupler 408 may comprise a different number of output ports. For example, in certain embodiments where the coherent receiver 402 is configured as a dual polarization optical hybrid, the coupler 408 may be configured as a 2:2 coupler with two output (2) ports.

Additionally, it is to be appreciated that, in certain embodiments, the MZM structure 101" may be implemented without the coupler 408. For example, in certain embodi-ments where the coherent receiver 402 is configured as a single polarization optical hybrid, the first optical output signal from the MZM structure 101$a$' and the second optical output signal from the second MZM structure 101$b$' may be combined by a corresponding coupler of the coherent receiver 402. In another example where the coherent receiver 402 is configured as a 4×4 MMI implementation of an optical hybrid, the first optical output signal from the MZM structure 101$a$' and the second optical output signal from the second MZM structure 101$b$' may be combined by a corresponding coupler of the coherent receiver 402. The same concept should also work with a 4×4 MMI implemen-tation of the optical hybrid. In various embodiments, cou-pling of the first optical output signal from the MZM structure 101$a$' and the second optical output signal from the second MZM structure 101$b$' may be realized through one or more digital signal processing techniques. For example, in various embodiments, coupling of the first optical output signal from the MZM structure 101$a$' and the second optical output signal from the second MZM structure 101$b$' may involve adjustment of a digital signal processing algorithm employed by the coherent receiver 402 to account for one or more different input ports where the oscillator signal 414 enters the optical hybrid.

In one or more embodiments, the coupler 408 may be configured to combine the first optical output signal from the MZM structure 101$a$' and the second optical output signal from the second MZM structure 101$b$' into an oscillator signal 414. The oscillator signal 414 may be a redundant local oscillator for the coherent receiver 402. The oscillator signal 414 may be an intensity modulated signal and/or a phase modulated signal. In certain embodiments, the oscil-lator signal 414 may alternatively be an optical NRZ signal. However, it is to be appreciated that, in certain embodi-ments, the oscillator signal 414 may be configured as a different type of optical modulation signal. In certain embodiments, the MZM structure 101" may also include a coupler 411 and/or a coupler 413 respectively configured as a 1:2 coupler with two output (2) ports to provide the first optical output signal associated with the MZM structure 101$a$' and/or the second optical output signal associated with the second MZM structure 101$b$' to the coupler 408 and/or the coherent receiver 402.

In one or more embodiments, the MZM structure 100" may be coupled to the coherent receiver 402. The coherent receiver 402 may be configured to receive the oscillator signal 414 from the first MZM structure 101$a$' and the second MZM structure 101$b$'. For example, the MZM struc-ture 100" may provide the oscillator signal 414 to the coherent receiver 402 via the output port of the coupler 408. The coherent receiver 402 may be configured to detect an amplitude and/or a phase associated with an optical signal 412. The optical signal 412 may be an optical signal provided by a DFB laser of the MZM structure 101$a$' and/or the MZM structure 101$b$'. In various embodiments, the coherent receiver 402 may be configured to mix the optical signal 412 with the oscillator signal 414 to, for example, modify a phase and/or an amplitude associated with the optical signal 412.

FIG. 5 illustrates a system 500 that facilitates optical communications such as, for example, short-reach optical communications according to one or more embodiments of the present disclosure. In one or more embodiments, the system 500 is configured to generate an output optical signal using a dual-facet DFB laser in an MZM structure. The system 500 includes an MZM structure 501. In one or more embodiments, the MZM structure 501 may be a silicon photonic MZM. In one or more embodiments, the MZM structure 501 may be configured as a modulator to convert one or more data streams from an electrical domain to an optical domain. For example, in one or more embodiments, the MZM structure 501 may be configured as a modulator to convert one or more electrical lanes into one or more optical lanes. In certain embodiments, the MZM structure 501 may be an alternate embodiment of the MZM structure 101. It is also to be appreciated that one or more components and/or the functionality herein with respect to the system 500 may be provided in whole or in part with any other embodiment described herein.

The MZM structure 501 includes a DFB laser 502, a semiconductor device 504, a semiconductor device 506, a semiconductor device 514, and/or a semiconductor device 516. The DFB laser 502 may be a dual-facet DFB laser 502 that includes a first output facet 503 and a second output facet 505. The first output facet 503 may be a front facet of the DFB laser 502 and the second output facet 505 may be a back facet of the DFB laser 502. Alternatively, the first output facet 503 may be a back facet of the DFB laser 502 and the second output facet 505 may be a front facet of the DFB laser 502. Furthermore, the first output facet 503 and the second output facet 505 of the DFB laser 502 may be light emitting regions of the DFB laser 502. In one or more embodiments, the DFB laser 502 may be configured as a light source to generate an optical input signal 510. The optical input signal 510 may be, for example, an optical signal associated with data for transmission via an optical fiber. For example, in one or more embodiments, the optical input signal 510 may be an unmodulated optical carrier. In one or more embodiments, the DFB laser 502 may emit the optical input signal 510 at a particular wavelength. In certain embodiments, the DFB laser 502 may alternatively be implemented separate from the MZM structure 501. For example, in certain embodiments, the DFB laser 502 may alternatively be implemented separate from the semiconductor device 504, the semiconductor device 506, the semiconductor device 514, and/or the semiconductor device 516.

The optical input signal 510 may exit the DFB laser 502 via the first output facet 503 and the second output facet 505. For instance, a waveguide of the DFB laser 502 may be optically aligned with the first output facet 503 and the second output facet 505 such that the optical input signal 510 transmitted via the waveguide may exit the DFB laser 502 via the first output facet 503 and the second output facet 505. In various embodiments, the DFB laser 502 may comprise an active region that contains a periodically structured element or diffraction grating to impose periodic changes in a refractive index of the waveguide to facilitate emitting the optical input signal 510 via the first output facet 503 and the second output facet 505.

In one or more embodiments, a first side of the semiconductor device 504, the semiconductor device 506, the semiconductor device 514, and the semiconductor device 516 are coupled via an input waveguide 507. Furthermore, a second side of the semiconductor device 504, the semiconductor device 506, the semiconductor device 514, and the semiconductor device 516 are coupled via an output waveguide 509. In one or more embodiments, the input waveguide 507 of the MZM structure 501 is configured to receive the optical input signal 510. In an embodiment, the semiconductor device 504, the semiconductor device 506, a top portion of the input waveguide 507, and a top portion of the output waveguide 509 may correspond to a first waveguide interferometer arm structure 511 of the MZM structure 501. Furthermore, the semiconductor device 514, the semiconductor device 516, a bottom portion of the input waveguide 507, and a bottom portion of the output waveguide 509 may correspond to a second waveguide interferometer arm structure 513 of the MZM structure 501. In certain embodiments, the first waveguide interferometer arm structure 511 of the MZM structure 501 may include a coupler 520 and/or a coupler 522 respectively configured as a 1:2 coupler with two output (2) ports. Additionally, in certain embodiments, the second waveguide interferometer arm structure 513 of the MZM structure 501 may include a coupler 524 and/or a coupler 526 respectively configured as a 1:2 coupler with two output (2) ports.

The first waveguide interferometer arm structure 511 may be directly coupled to the first output facet 503 of the DFB laser 502. For example, the top portion of the input waveguide 507 associated with the semiconductor device 504 and the semiconductor device 506 may be directly coupled to the first output facet 503 of the DFB laser 502. The first output facet 503 of the DFB laser 502 may therefore emit the optical input signal 510 to the first waveguide interferometer arm structure 511. Although described herein with reference to a direct coupling of the first output facet 503 of the DFB laser 502 and the first waveguide interferometer arm structure 511, the present disclosure contemplates that such a coupling may refer to any connection by which optical signals may propagate between the first output facet 503 of the DFB laser 502 and the first waveguide interferometer arm structure 511. Additionally, the second waveguide interferometer arm structure 513 may be directly coupled to the second output facet 505 of the DFB laser 502. For example, the bottom portion of the input waveguide 507 associated with the semiconductor device 514 and the semiconductor device 516 may be directly coupled to the first output facet 505 of the DFB laser 502. The second output facet 505 of the DFB laser 502 may therefore emit the optical input signal 510 to the second waveguide interferometer arm structure 513. Accordingly, with the MZM structure 501 of the present application, the optical input signal 510 may be simultaneously or approximately simultaneously provided to the first waveguide interferometer arm structure 511 and the second waveguide interferometer arm structure 513 via the first output facet 503 and the second output facet 505, respectively. Although described herein with reference to a direct coupling of the second output facet 505 of the DFB laser 502 and the second waveguide interferometer arm structure 513, the present disclosure contemplates that such a coupling may refer to any connection by which optical signals may propagate between the second output facet 505 of the DFB laser 502 and the second waveguide interferometer arm structure 513.

The MZM structure 501 may be configured to convert the optical input signal 510 into an optical output signal 512 through application of the optical input signal 510 emitted from the first output facet 503 of the DFB laser 502 to the first waveguide interferometer arm structure 511, and further application of the optical input signal 510 emitted from the second output facet 505 of the DFB laser 502 to the second waveguide interferometer arm structure 513. The input waveguide 507 and/or the output waveguide 509 may be optical waveguides. For example, the input waveguide 507 and/or the output waveguide 509 may include a core and/or a cladding. Light may be transmitted via the core of the input waveguide 507 and/or the output waveguide 509. Furthermore, the cladding of the input waveguide 507 and/or the output waveguide 509 may be a surrounding medium for the core that is not associated with transmission of light. The core of the input waveguide 507 and/or the output waveguide 509 may comprise a higher index of refraction than the cladding, such that, in operation, light is directed by the cladding back toward the core and, light is thereby propagated through the waveguide. In an embodiment, the core of the input waveguide 507 and/or the output waveguide 509 may be formed of, include, or otherwise comprise silicon. Additionally, the cladding of the input waveguide 507 and/or the output waveguide 509 may include silicon dioxide or silicon nitride. However, it is to be appreciated that, in certain embodiments, the core and/or the cladding of the input waveguide 507 and/or the output waveguide 509 may comprise a different type of material such that the core comprises a higher index of refraction than the cladding. In one or more embodiments, the input waveguide 507 and/or the output waveguide 509 may be patterned into a silicon layer of the MZM structure 501.

The semiconductor device 504 of the first waveguide interferometer arm structure 511 may be configured as a top arm phase shifter of the first waveguide interferometer arm structure 511 and the semiconductor device 506 of the first waveguide interferometer arm structure 511 may be configured as a bottom arm phase shifter of the first waveguide interferometer arm structure 511. In one or more embodiments, the semiconductor device 504 may comprise first semiconductor material associated with a first doped region of the MZM structure 501 and the semiconductor device 506 may comprise second semiconductor material associated with a second doped region of the MZM structure 501. For example, in one or more embodiments, the first semiconductor material of the semiconductor device 504 may be formed of, include, or otherwise comprise silicon (e.g., doped silicon), silicon dioxide, silicide and/or a metal. Furthermore, in one or more embodiments, the second semiconductor material of the semiconductor device 506 may be formed of, include, or otherwise comprise silicon (e.g., doped silicon), silicon dioxide, silicide and/or a metal. In certain embodiments, the semiconductor device 504 may include a first set of electrodes and the semiconductor device 506 may include a second set of electrodes.

Additionally, the semiconductor device 514 of the second waveguide interferometer arm structure 513 may be configured as a top arm phase shifter of the second waveguide interferometer arm structure 513 and the semiconductor device 516 of the second waveguide interferometer arm structure 513 may be configured as a bottom arm phase shifter of the second waveguide interferometer arm structure 513. In one or more embodiments, the semiconductor device 514 may comprise third semiconductor material associated with a third doped region of the MZM structure 501 and the semiconductor device 516 may comprise fourth semiconductor material associated with a fourth doped region of the MZM structure 501. For example, in one or more embodiments, the third semiconductor material of the semiconductor device 514 may be formed of, include, or otherwise comprise silicon (e.g., doped silicon), silicon dioxide, silicide and/or a metal. Furthermore, in one or more embodiments, the fourth semiconductor material of the semiconductor device 516 may be formed of, include, or otherwise comprise silicon (e.g., doped silicon), silicon dioxide, silicide and/or a metal. In certain embodiments, the semiconductor device 514 may comprise a third set of electrodes and the semiconductor device 516 may comprise a fourth set of electrodes.

In an embodiment, the first waveguide interferometer arm structure 511 and the second waveguide interferometer arm structure 513 may be configured with corresponding arm lengths. In another embodiment, arm lengths of the first waveguide interferometer arm structure 511 and the second waveguide interferometer arm structure 513 may be different. In certain embodiments, the semiconductor device 504 may include one or more electrodes, one or more phase shifters, and/or one or more bias components. The semiconductor device 506 may also include one or more electrodes, one or more phase shifters, and/or one or more bias components. Additionally, the semiconductor device 514 may include one or more electrodes, one or more phase shifters, and/or one or more bias components. The semiconductor device 516 may also include one or more electrodes, one or more phase shifters, and/or one or more bias components In an embodiment, the MZM structure 501 may be configured to convert the optical input signal 510 into the optical output signal 512 through application of the optical input signal 510 emitted from the first output facet 503 of the DFB laser 502 to the semiconductor device 504 and the semiconductor device 506 of the first waveguide interferometer arm structure 511, and further application of the optical input signal 510 emitted from the second output facet 505 of the DFB laser 503 to the semiconductor device 514 and the semiconductor device 516 of the second waveguide interferometer arm structure 513. The semiconductor device 504, the semiconductor device 506, the semiconductor device 514, and/or the semiconductor device 516 may be configured as an electrode (e.g., a phase modulating electrode, an intensity modulating electrode, or another type of electrode), a tunable optical filter, or another type of semiconductor device to provide for modulation of the optical input signal 510 emitted from the first output facet 503 and the second output facet 505.

In an example, the MZM structure 501 may be configured to convert the optical input signal 510 into the optical output signal 512 through application of the optical input signal 510 emitted from the first output facet 503 of the DFB laser 502 to at least a first set of electrodes of the first waveguide interferometer arm structure 511, and further application of the optical input signal 510 emitted from the second output facet 505 of the DFB laser 503 to at least a second set of electrodes of the second waveguide interferometer arm structure 513. In another example, the MZM structure 501 may be configured to convert the optical input signal 510 into the optical output signal 512 through application of the optical input signal 510 emitted from the first output facet 503 of the DFB laser 502 to at least a first set of phase modulating electrodes of the first waveguide interferometer arm structure 511, and further application of the optical input signal 510 emitted from the second output facet 505 of the DFB laser 503 to at least a second set of phase modulating electrodes of the second waveguide interferometer arm structure 513. In yet another example, the MZM structure 501 may be configured to convert the optical input signal 510 into the optical output signal 512 through application of the optical input signal 510 emitted from the first output facet 503 of the DFB laser 502 to at least a first set of intensity modulating electrodes of the first waveguide interferometer arm structure 511, and further application of the optical input signal 510 emitted from the second output facet 505 of the DFB laser 503 to at least a second set of intensity modulating electrodes of the second waveguide interferometer arm structure 513. In yet another example, the MZM structure 501 may be configured to convert the optical input signal 510 into the optical output signal 512 through application of the optical input signal 510 emitted from the first output facet 503 of the DFB laser 502 to at least a first set of tunable optical filters of the first waveguide interferometer arm structure 511, and further application of the optical input signal 510 emitted from the second output facet 505 of the DFB laser 503 to at least a second set of tunable optical filters of the second waveguide interferometer arm structure 513.

In certain embodiments, the MZM structure 501 includes a phase electrode 516. The phase electrode 516 may be configured to adjust relative phase between the first waveguide interferometer arm structure 511 and the second waveguide interferometer arm structure 513. For example, at an output of the first waveguide interferometer arm structure 511, a first optical signal may be generated. The relative phase of different pulses in the first optical signal may be 0 or $\pi$. Furthermore, at an output of the second waveguide interferometer arm structure 513, a second optical signal may be generated. The relative phase of different pulses in the second optical signal may also be 0 or $\pi$. As such, the phase electrode 516 may be configured to adjust intensity of the first optical signal to be twice the intensity of the second optical signal. In certain embodiments, the phase electrode 516 may be configured to adjust intensity of the second optical signal to be twice the intensity of the first optical signal. In various embodiments, the phase electrode 516 may be configured based on a modulation format for the optical output signal 512. In certain embodiments, the output waveguide 509 includes an optical combiner configured to combine the first optical signal provided by the first waveguide interferometer arm structure 511 and the second optical signal provided by the second waveguide interferometer arm structure 513 into the optical output signal 512.

The optical output signal 512 may be an intensity modulated signal and/or a phase modulated signal. In certain embodiments, the optical output signal 512 may be an optical PAM signal such as, for example, an optical PAM-4 signal or another type of PAM-N signal. In certain embodiments, the optical output signal 512 may alternatively be an optical NRZ signal. However, it is to be appreciated that, in certain embodiments, the optical output signal 512 may be configured as a different type of optical modulation signal. In certain embodiments, the optical output signal 512 may be dependent on a driving signal of the Mach Zehnder arms of the MZM structure 501.

In certain embodiments, the output waveguide 509 may include a coupler 528 to couple respective signals from the first waveguide interferometer arm structure 511 and the second waveguide interferometer arm structure 513 to provide the optical output signal 512. The coupler 528 may be an optical coupler, such as an MMI coupler, a directional coupler, a grating coupler, or another type of coupler configured to generate interference between respective signals from the first waveguide interferometer arm structure 511 and the second waveguide interferometer arm structure 513 to provide the optical output signal 512. As illustrated in FIG. 5, the coupler 528 is configured as a 2:2 coupler with two (2) output ports to provide the optical output signal 512. However, it is to be appreciated that, in certain embodiments, the coupler 508 may be configured as a 2:1 coupler with a single (1) output port to provide the optical output signal 512.

With traditional nested MZM structures, light from an external laser is split into two arms of a parent interferometer of the MZM structure, with each arm comprising a child MZM structure. In contrast, with the MZM structure 501 of the present application, the laser (e.g., the DFB laser 502) is integrated into the interferometer structure. Since the optical input signal 510 provided to the first waveguide interferometer arm structure 511 and the second waveguide interferometer arm structure 513 originate from the same laser (e.g., the DFB laser 502), both signal tributaries within the MZM structure 501 for the optical input signal 510 are phase-coherent. Additionally, in certain embodiments, relative phase between the optical input signal 510 provided to the first waveguide interferometer arm structure 511 and the second waveguide interferometer arm structure 513 may be adjusted via a phase shifter to bias the first waveguide interferometer arm structure 511 and the second waveguide interferometer arm structure 513 at a desired operating point. In various embodiments, optical power at an output of the MZM structure 501 may be doubled by employing the same laser (e.g., the DFB laser 502), as compared to traditional MZM structures.

FIG. 6A illustrates a system 600 that facilitates optical communications such as, for example, optical transmitter communications according to one or more embodiments of the present disclosure. The system 600 may enable redundancy in a set of optical modulators (e.g., a set of pluggable transceivers) to provide improved optical communication performance for scenarios with a failure of a DFB laser. For instance, for a pluggable transceiver module that includes a set of 2, 4, 8 or 16 optical transmitters, an optical modulator scheme with M+1 redundant DFB lasers (where M is an integer) may be employed to increase resiliency of the pluggable transceiver. In this regard, the system 600 includes a group of MZM structures 601*a-n* (e.g., a group of four MZM structures that includes MZM structure 601*a*, MZM structure 601*b*, MZM structure 601*c*, and MZM structure 601*n*). The system 600 also includes a group of DFB lasers 602*a*-(n+1) (e.g., a group of five DFB lasers that includes DFB laser 602*a*, DFB laser 602*b*, DFB laser 602*c*, DFB laser 602*n*, and DFB laser 602*n*+1). As such, in a scenario where one of the DFB lasers fail, routing of the DFB lasers may be modified accordingly to maintain proper operation of the group of MZM structures 601*a-n*. For example, as illustrated in FIG. 6A, all of the DFB lasers in the group of DFB lasers 602*a-n* may be operating properly such that the DFB laser 602*a* provides an optical output signal to the MZM structure 601*a*, the DFB laser 602*b* provides an optical output signal to the MZM structure 601*b*, the DFB laser 602*c* provides an optical output signal to the MZM structure 601*c*, the DFB laser 602*n* provides an optical output signal to the MZM structure 601*n*, and the DFB laser 602*n*+1 is not powered (e.g., the DFB laser 602*n*+1 is employed as a redundant DFB laser). However, as illustrated in FIG. 6B, a DFB laser such as, for example, the DFB laser 602*c* may fail. As such, system 600' illustrated in FIG. 6B may provide an alternate operating embodiment such that the DFB laser 602*a* provides an optical output signal to the MZM structure 101*a*, the DFB laser 602*b* provides an optical output signal to the MZM structure 101*b*, the DFB laser 602*n* provides an optical output signal to the MZM structure 101*c*, and the DFB laser 602*n*+1 provides an optical output signal to the MZM structure 101*n*.

Example Method for Providing Optical Communications Via a Dual-Facet DFB Laser in an MZM Structure FIG. 7 is a flowchart illustrating an example method that provides for optical communications via a dual-facet DFB laser in an MZM structure in accordance with one or more embodiments of the present disclosure. It will be understood that each block of the flowcharts, and combinations of blocks in the flowcharts, may be implemented by various means. In some example embodiments, certain ones of the operations herein may be modified or further amplified as described below. Moreover, in some embodiments additional optional operations may also be included. It should be appreciated that each of the modifications, optional additions, or amplifications described herein may be included with the operations herein either alone or in combination with any others among the features described herein. The operations illustrated in FIG. 7 may, for example, be performed by an example computing system 800 (shown in FIG. 8) that is embedded in a network interface module (e.g., the network interface module 202) and/or a NIC (e.g., the NIC 204). In some embodiments, the computing system 800 is a firmware computing system embedded in a network interface module (e.g., the network interface module 202) and/or a NIC (e.g., the NIC 204). In one or more embodiments, one or more of the operations illustrated in FIG. 7 may, for example, be performed by a network interface module (e.g., the network interface module 202) and/or a NIC (e.g., the NIC 204). In one or more embodiments, at operation 702, the computing system 800 emits an optical input signal via a first output facet of a DFB laser and a second output facet of the DFB laser. In one or more embodiments, at operation 704, the computing system 800 converts the optical input signal into an optical output signal by applying the optical input signal emitted from the first output facet of the DFB laser to a first waveguide interferometer arm structure of an MZM structure coupled (e.g., directly coupled) to the first output facet, and by applying the optical input signal emitted from the second output facet of the DFB laser to a second waveguide interferometer arm structure of the MZM structure coupled (e.g., directly coupled) to the second output facet.

In certain embodiments, applying the optical input signal emitted from the first output facet of the DFB laser to the first waveguide interferometer arm structure includes applying the optical input signal emitted from the first output facet of the DFB laser to a first electrode of the first waveguide interferometer arm structure, and applying the optical input signal emitted from the second output facet of the DFB laser to the second waveguide interferometer arm structure includes applying the optical input signal emitted from the second output facet of the DFB laser to a second electrode of the second waveguide interferometer arm structure.

In certain embodiments, applying the optical input signal emitted from the first output facet of the DFB laser to the first waveguide interferometer arm structure includes applying the optical input signal emitted from the first output facet of the DFB laser to a first tunable optical filter of the first waveguide interferometer arm structure, and applying the optical input signal emitted from the second output facet of the DFB laser to the second waveguide interferometer arm structure includes applying the optical input signal emitted from the second output facet of the DFB laser to a second tunable optical filter of the second waveguide interferometer arm structure.

Example Computing System

FIG. 8 illustrates the computing system 800 that may be embedded in a datacenter network system. In some cases, the computing system 800 may be a firmware computing system communicatively coupled with, and configured to control, one or more circuit modules associated with a network interface module (e.g., a transceiver module). For example, the computing system 800 may be a firmware computing system and/or a controller computing system communicatively coupled with one or more circuit modules, such as a network interface module (e.g., the network interface module 202), a laser (e.g., a DFB laser such as the DFB laser 102), a driver (e.g., the driver 208), and/or a NIC (e.g., the NIC 204). The computing system 800 may include or otherwise be in communication with a processor 810, a memory circuitry 820, and communication circuitry 830. In some embodiments, the processor 810 (which may include multiple or co-processors or any other processing circuitry associated with the processor) may be in communication with the memory circuitry 820. The memory circuitry 820 may comprise non-transitory memory circuitry and may include one or more volatile and/or non-volatile memories. In some examples, the memory circuitry 820 may be an electronic storage device (e.g., a computer readable storage medium) configured to store data that may be retrievable by the processor 810. In some examples, the data stored in the memory 820 may include communication protocol data, or the like for enabling the apparatus to carry out various functions or methods in accordance with embodiments of the present disclosure, described herein.

In some examples, the processor 810 may be embodied in a number of different ways. For example, the processor may be embodied as one or more of various hardware processing means such as a microprocessor, a coprocessor, a digital signal processor (DSP), a controller, or a processing element with or without an accompanying DSP. The processor 810 may also be embodied in various other processing circuitry including integrated circuits such as, for example, an FPGA (field programmable gate array), a microcontroller unit (MCU), an ASIC (application specific integrated circuit), a hardware accelerator, or a special-purpose electronic chip. Furthermore, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining, and/or multithreading. In some embodiments, the processor 810 is a microprocessor.

In an example embodiment, the processor 810 may be configured to execute instructions, such as computer program code or instructions, stored in the memory circuitry 820 or otherwise accessible to the processor 810. Alternatively or additionally, the processor 810 may be configured to execute hard-coded functionality. As such, whether configured by hardware or software instructions, or by a combination thereof, the processor 810 may represent a computing entity (e.g., physically embodied in circuitry) configured to perform operations according to an embodiment of the present disclosure described herein. For example, when the processor 810 is embodied as an ASIC, FPGA, or similar, the processor may be configured as hardware for conducting the operations of an embodiment of the present disclosure. Alternatively, when the processor 810 is embodied to execute software or computer program instructions, the instructions may specifically configure the processor 810 to perform the algorithms and/or operations described herein when the instructions are executed. However, in some cases, the processor 810 may be a processor of a device (e.g., a mobile terminal or a fixed computing device) specifically configured to employ an embodiment of the present disclosure by further configuration of the processor using instructions for performing the algorithms and/or operations described herein. The processor 810 may further include a clock, an arithmetic logic unit (ALU) and logic gates configured to support operation of the processor 810, among other things.

The computing system 800 may optionally also include the communication circuitry 830. The communication circuitry may be any means embodied in either hardware or a combination of hardware and software that is configured to receive and/or transmit data from/to a network and/or any other device or module in communication with the computing system 800. In this regard, the communication interface may include, for example, supporting hardware and/or software for enabling communications. As such, for example, the communication circuitry 830 may include a communication modem and/or other hardware/software for supporting communication via cable, universal serial bus (USB), integrated circuit receiver, or other mechanisms.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A system comprising:
a first distributed feedback (DFB) laser configured to generate a first optical input signal, wherein the DFB laser comprises a first output facet and a second output facet;
a second distributed feedback (DFB) laser configured to generate a second optical input signal, wherein the DFB laser comprises a first output facet and a second output facet;
a first Mach-Zehnder modulator (MZM) structure comprising at least:
a first waveguide interferometer arm structure coupled to the second output facet of the second DFB laser, wherein the second output facet of the second DFB laser is configured to emit the second optical input signal to the first waveguide interferometer arm structure; and
a second waveguide interferometer arm structure coupled to the first output facet of the first DFB laser, wherein the first output facet of the first DFB laser is configured to emit the first optical input signal to the second waveguide interferometer arm structure; and
a second MZM structure switchably coupled with the first output facet of the second DFB laser, wherein:
the second DFB laser is configured to operate in response to a failure condition associated with the first DFB laser; and
the first DFB laser is configured to operate in response to a failure condition associated with the second DFB laser.

2. The system of claim 1, wherein the first waveguide interferometer arm structure comprises one or more first electrodes, and the second waveguide interferometer arm structure comprises one or more second electrodes.

3. The system of claim 2, wherein the one or more first electrodes comprise at least a first phase modulating electrode of the first waveguide interferometer arm structure, and the one or more second electrodes comprise at least a second phase modulating electrode of the second waveguide interferometer arm structure.

4. The system of claim 2, wherein the one or more first electrodes comprise at least a first intensity modulating electrode of the first waveguide interferometer arm structure, and the one or more second electrodes comprise at least a second intensity modulating electrode of the second waveguide interferometer arm structure.

5. The system of claim 1, wherein the first waveguide interferometer arm structure comprises a first tunable optical filter, and the second waveguide interferometer arm structure comprises a first tunable optical filter.

6. The system of claim 5, wherein the first and/or the second tunable optical filters comprise a microring modulator.

7. The system of claim 5, wherein the first and the second output facets of the first DFB laser and the first and the second outputs of the second DFB laser are coupled to an array of optical waveguide MZMs via a switchable waveguide network.

8. The system of claim 1, wherein the second MZM structure further comprises a second waveguide interferometer arm structure coupled to the first output facet of the second DFB laser.

9. The system of claim 1, wherein the second MZM structure further comprises a first waveguide interferometer arm structure coupled to a third DFB laser.

10. The system of claim 1, further comprising a third MZM structure coupled with the first DFB laser.

11. The system of claim 10, wherein the third MZM structure further comprises a first waveguide interferometer arm structure coupled to the second output facet of the first DFB laser.

12. The system of claim 1, wherein the first MZM structure and the second MZM structure are integrated on a photonic integrated circuit.

13. A system comprising:
a first distributed feedback (DFB) laser configured to generate a first optical input signal, wherein the DFB laser comprises a first output facet and a second output facet;
a second distributed feedback (DFB) laser configured to generate a second optical input signal, wherein the DFB laser comprises a first output facet and a second output facet;
a first Mach-Zehnder modulator (MZM) structure comprising at least:
a first waveguide interferometer arm structure coupled to the second output facet of the second DFB laser, wherein the second output facet of the second DFB laser is configured to emit the second optical input signal to the first waveguide interferometer arm structure; and
a second waveguide interferometer arm structure coupled to the first output facet of the first DFB laser, wherein the first output facet of the first DFB laser is configured to emit the first optical input signal to the second waveguide interferometer arm structure,
wherein the first and the second output facets of the first DFB laser and the first and the second outputs of the second DFB laser are coupled to an array of optical waveguide MZMs via a switchable waveguide network, such that the first MZM is configured to selectively operate using the first DFB laser or the second DFB laser via the switchable waveguide network that maintains phase-coherence between the first output facet and the second output facet of one of the first DFB laser or the second DFB laser.

14. The system of claim 13, wherein:

the second DFB laser is configured to operate in response to a failure condition associated with the first DFB laser; and the first DFB laser is configured to operate in response to a failure condition associated with the second DFB laser.

15. The system of claim 13, further comprising a second MZM structure coupled with the first output facet of the second DFB laser.

16. The system of claim 15, wherein the second MZM structure further comprises a second waveguide interferometer arm structure coupled to the first output facet of the second DFB laser.

17. The system of claim 15, wherein the second MZM structure further comprises a first waveguide interferometer arm structure coupled to a third DFB laser.

18. The system of claim 15, further comprising a third MZM structure coupled with the first DFB laser.

19. The system of claim 18, wherein the third MZM structure further comprises a first waveguide interferometer arm structure coupled to the second output facet of the first DFB laser.

20. The system of claim 15, wherein the first MZM structure and the second MZM structure are integrated on a photonic integrated circuit.

21. The system of claim 13, wherein the first waveguide interferometer arm structure comprises one or more first electrodes, and the second waveguide interferometer arm structure comprises one or more second electrodes.

* * * * *